US011699224B2

(12) United States Patent
Bidault

(10) Patent No.: US 11,699,224 B2
(45) Date of Patent: *Jul. 11, 2023

(54) NEURAL NETWORK TRAINING DEVICE, SYSTEM AND METHOD

(71) Applicant: STMICROELECTRONICS (ROUSSET) SAS, Rousset (FR)

(72) Inventor: Laurent Bidault, Trets (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/522,541

(22) Filed: Nov. 9, 2021

(65) Prior Publication Data

US 2022/0067916 A1    Mar. 3, 2022

Related U.S. Application Data

(63) Continuation of application No. 16/687,349, filed on Nov. 18, 2019, now Pat. No. 11,200,659.

(51) Int. Cl.
  *G06T 7/00* (2017.01)
  *G06N 3/04* (2023.01)
  (Continued)

(52) U.S. Cl.
  CPC .......... *G06T 7/0004* (2013.01); *G06F 18/214* (2023.01); *G06F 18/2431* (2023.01);
  (Continued)

(58) Field of Classification Search
  None
  See application file for complete search history.

(56) References Cited

U.S. PATENT DOCUMENTS 6,738,954 B1    5/2004 Allen et al.
9,739,783 B1    8/2017 Kumar et al.
(Continued)

FOREIGN PATENT DOCUMENTS

CN    106372390 A    2/2017
CN    108564026 A    9/2018

OTHER PUBLICATIONS

Brownlee, "Image Augmentation for Deep Learning With Keras," published online on Jun. 29, 2016, updated Mar. 2017, downloaded from https://machinelearningmastery.com/image-augmentation-deep-learning-keras/, 46 pages.

(Continued)

*Primary Examiner* — Leon Flores
(74) *Attorney, Agent, or Firm* — Seed Intellectual Property Law Group LLP

(57) ABSTRACT

A device includes image generation circuitry and convolutional-neural-network circuitry. The image generation circuitry, in operation, generates a digital image representation of a wafer defect map (WDM). The convolutional-neural-network circuitry, in operation, generates a defect classification associated with the WDM based on: the digital image representation of the WDM and a data-driven model associating WDM images with classes of a defined set of classes of wafer defects and generated using a training data set augmented based on defect pattern orientation types associated with training images.

33 Claims, 24 Drawing Sheets

(51) Int. Cl.
*G06N 3/08* (2023.01)
*G06F 18/214* (2023.01)
*G06F 18/2431* (2023.01)
*G06V 10/764* (2022.01)
*G06V 10/77* (2022.01)
*G06V 10/774* (2022.01)
*G06V 10/776* (2022.01)
*G06V 10/82* (2022.01)

(52) U.S. Cl.
CPC ............... *G06N 3/04* (2013.01); *G06N 3/08* (2013.01); *G06V 10/764* (2022.01); *G06V 10/774* (2022.01); *G06V 10/776* (2022.01); *G06V 10/7715* (2022.01); *G06V 10/82* (2022.01); *G06T 2207/20081* (2013.01); *G06T 2207/20084* (2013.01); *G06T 2207/30148* (2013.01); *G06V 2201/06* (2022.01)

(56) References Cited

U.S. PATENT DOCUMENTS

| | | | |
|---|---|---|---|
| 9,934,364 | B1 | 4/2018 | Kumar et al. |
| 11,200,659 | B2 * | 12/2021 | Bidault ............ G06N 3/0454 |
| 2014/0268105 | A1 | 9/2014 | Bills et al. |
| 2017/0032285 | A1 | 2/2017 | Sharma et al. |
| 2017/0328983 | A1 | 11/2017 | Volgyesi et al. |
| 2017/0337682 | A1 | 11/2017 | Liao et al. |
| 2018/0330493 | A1 | 11/2018 | Milligan |
| 2019/0005357 | A1 | 1/2019 | Bhaviripudi et al. |
| 2019/0257767 | A1 | 8/2019 | Shaubi et al. |
| 2019/0294923 | A1 | 9/2019 | Riley et al. |
| 2019/0378260 | A1 | 12/2019 | Brauer |
| 2020/0134809 | A1 | 4/2020 | Moioli et al. |
| 2020/0151538 | A1 | 5/2020 | Sha et al. |
| 2020/0161081 | A1 | 5/2020 | Pathangi et al. |
| 2020/0193588 | A1 | 6/2020 | Brauer et al. |
| 2021/0073972 | A1 | 3/2021 | Wu et al. |

OTHER PUBLICATIONS

Hsu, "Clustering Ensemble for Identifying Defective Wafer Bin Map in Semiconductor Manufacturing," Mathematical Problems in Engineering 2015:707358, 2015. (12 pages).

Nakata et al., "A Comprehensive Big-Data-Based Monitoring System for Yield Enhancement in Semiconductor Manufacturing," IEEE Transactions on Semiconductor Manufacturing 30(4):339-344, 2017.

Nakazawa, "Wafer Map Defect Pattern Classification and Image Retrieval Using Convolutional Neural Network", *IEEE Transactions on Semiconductor Manufacturing* 31(2):309-314, May 2018.

Taylor et al., "Improving Deep Learning using Generic Data Augmentation," *IEEE Symposium Series on Computational Intelligence*, Nov. 18-21, 2018, Bangalore, India, 6 pages.

Wikipedia, "Generative Adversarial Network," downloaded from https://en.wikipedia.org/wiki/Generative_adversarial_network on Jan. 9, 2019, 3 pages.

Wu et al., "Wafer Map Failure Pattern Recognition and Similarity Ranking for Large-Scale Data Sets," IEEE Transactions on Semiconductor Manufacturing 28(1):1-12, 2015.

* cited by examiner

NEURAL NETWORK TRAINING DEVICE, SYSTEM AND METHOD

BACKGROUND

Technical Field

The present disclosure generally relates to training deep learning machines. For example, the present disclosure relates to training embedded systems implementing artificial neural networks (ANNs), such as convolutional neural networks (CNNs), for example, to classify wafer defect maps (WDMs).

Description of the Related Art

Various computer vision, speech recognition, and signal processing applications may benefit from the use of learning machines, such as deep convolutional neural networks (DCNN). A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer.

For example, if a plurality of two-dimensional pictures of faces is provided as input to a DCNN, the DCNN may learn a variety of characteristics of faces such as edges, curves, angles, dots, color contrasts, bright spots, dark spots, etc. These features may be learned at one or more first layers of the DCNN. Then, in one or more second layers, the DCNN may learn a variety of recognizable features of faces such as eyes, eyebrows, foreheads, hair, noses, mouths, cheeks, etc.; each of which is distinguishable from the other features. That is, the DCNN learns to recognize and distinguish an eye from an eyebrow or any other facial feature. In one or more third and then subsequent layers, the DCNN learns entire faces and higher order characteristics such as race, gender, age, emotional state, etc. The DCNN may even be taught in some cases to recognize the specific identity of a person. For example, a random image can be identified as a face, and the face can be recognized as Person_A, Person_B, or some other identity.

In other examples, a DCNN can be provided with a plurality of pictures of animals, and the DCNN can be taught to identify lions, tigers, and bears; a DCNN can be provided with a plurality of pictures of automobiles, and the DCNN can be taught to identify and distinguish different types of vehicles; and many other DCNNs can also be formed. DCNNs can be used to learn word patterns in sentences, to identify music, to analyze individual shopping patterns, to play video games, to create traffic routes, and DCNNs can be used for many other learning-based tasks too.

DCNNs can be applied to manufacturing processes. For example, semiconductor wafers are generally manufactured using production lines. Each semiconductor wafer may include a plurality of chips, which are separated or cut from one another as part of the production process. The wafers may include physical defects which may cause one or more chips of the wafer to fail. Defects may include voids, craters, protrusions, bridges, particles, etc.

During the production process, wafers may be inspected at various points of the process to look for physical defects and to assess production quality. A wafer defect map (WDM) may be generated based on the inspection. A wafer defect map may be a text file which includes the coordinates of defects.

Defects may have causes which result in patterns in a wafer defect map. For example, particles in a clean room may be considered to have a random cause and may result in defects uniformly distributed on a wafer. Defects also may have specific geometries, such as specific arrangements of defects on a wafer which are consistent with a particular cause. For example, a misalignment of a wafer in a particular step performed on a particular machine may result in a wafer defect map with a pattern consistent with the cause of the defect. For example, a pattern consistent with a scratch may indicate machine handling is the cause of the defect in the WDM. The wafer defect maps may be examined to determine causes of defects based on patterns in the wafer defect maps. CNNs, such as DCNNs, may be trained to classify WDMs.

BRIEF SUMMARY

In an embodiment, a device comprises: image generation circuitry, which, in operation, generates a digital image representation of a wafer defect map (WDM); and convolutional-neural-network (CNN) circuitry, which, in operation, generates a defect classification associated with the WDM based on: the digital image representation of the WDM; and a data-driven model associating WDM images with classes of a defined set of classes of wafer defects and generated using a data set of images, wherein the data set of images includes training images and augmented images generated based on defect pattern orientation types associated with the training images. In an embodiment, the training images are digital image representations of WDMs. In an embodiment, the training images are artificial wafer defect digital images (AWDIs). In an embodiment, the training images are tagged with an indicator of a defect pattern orientation type. In an embodiment, the detect pattern orientation type is one of a defined set of defect pattern orientation types. In an embodiment, the defined set of defect pattern orientation types includes a repeater pattern orientation type; a horizontal and vertical pattern orientation type; a mirror pattern orientation type; a specific defect pattern orientation type; and a non-oriented defect pattern orientation type. In an embodiment, the tags are embedded in pixels of the respective training images. In an embodiment, the training images have a first pixel region containing defect patterns and a second pixel region and the tags are embedded in pixels of the second pixel region. In an embodiment, the tags are embedded in pixels of a defined location of the training images. In an embodiment, the defined location does not contain defect patterns of the defined set of classes of wafer defect patterns. In an embodiment, the tags are embedded in comma separated text associated with the respective training images. In an embodiment, the CNN circuitry, in operation, associates, based on the digital image representation of the WDM and the data-driven model, one or more labels and one or more root cause tags with the WDM which are associated with a defect cause. In an embodiment, wherein the CNN circuitry includes one or more convolutional layers. In an embodiment, in a training mode of operation, the CNN circuitry generates the data-driven model using the augmented training data set. In an embodiment, the augmented training data set includes, for each defined class of the set of classes of wafer defects, a same number N of training images.

In an embodiment, a system comprises: one or more memories; and wafer-defect-map (WDM) classification circuitry coupled to the one or more memories, which, in operation, generates a defect classification associated with the WDM based on: a digital image representation of the WDM; and a data-driven model associating WDM images with classes of a defined set of classes of wafer defects and generated using a training data set of images, wherein the training data set of images includes training images and augmented training images generated based on defect pattern orientation types associated with the training images. In an embodiment, the training images are digital image representations of WDMs. In an embodiment, the training images are artificial wafer defect digital images (AWDIs). In an embodiment, the training images upon which augmentation of the training data set is based are tagged with an indicator of a defect pattern orientation type of a defined set of defect pattern orientation types. In an embodiment, the defined set of defect pattern orientation types includes a repeater pattern orientation type; a horizontal and vertical pattern orientation type; a mirror pattern orientation type; a specific defect pattern orientation type; and a non-oriented defect pattern orientation type. In an embodiment, the tags are embedded in pixels of respective training images upon which augmentation of the training data set is based. In an embodiment, the tags are embedded in pixels of a defined location of the training images. In an embodiment, the WDM classification circuitry, in operation, associates, based on the digital image representation of the WDM and the data-driven model, one or more labels and one or more root cause tags with the WDM which are associated with a defect cause. In an embodiment, in a training mode of operation, the WDM classification circuitry: augments the training images based on the defect pattern orientation types associated with the training images; and generates the data-driven model using the augmented training data set. In an embodiment, the augmented training data set includes, for each defined class of the set of classes of wafer defects, a same number N of training images. In an embodiment, the WDM classification circuitry, in operation, generates one or more control signals to control a wafer-production system based on defect classifications associated with one or more WDMs.

In an embodiment, a method comprises: generating a digital image representation of a wafer defect map (WDM); and generating a defect classification associated with the WDM based on: the digital image representation of the WDM; and a data-driven model associating WDM images with classes of a defined set of classes of wafer defects and generated using a training data set augmented based on defect pattern orientation types associated with training images. In an embodiment, method comprises generating the data-driven model using the augmented training data set. In an embodiment, the method comprises: generating the augmented training data set. In an embodiment, the method comprises tagging training image with indicators of defect pattern orientation types. In an embodiment, the method comprises embedding the tags in pixels of a defined location of the training images. In an embodiment, the method comprises removing the tags indicating the defect pattern orientation types after generating the augmented training data set and before generating the model. In an embodiment, the method comprises: generating one or more control signals to control a wafer-production process based on defect classifications associated with one or more WDMs. In an embodiment, the training images are digital image representations of WDMs. In an embodiment, the training images are artificial wafer defect digital images.

In an embodiment, a non-transitory computer-readable medium's contents configure a wafer defect map (WDM) classification system to perform a method, the method comprising: generating a digital image representation of a wafer defect map (WDM); and generating a defect classification associated with the WDM based on: the digital image representation of the WDM; and a data-driven model associating WDM images with classes of a defined set of classes of wafer defects and generated using a training data set augmented based on defect pattern orientation types associated with training images. In an embodiment, the method comprises generating the data-driven model using the augmented training data set. In an embodiment, the method comprises: generating the augmented training data set. In an embodiment, the contents comprise parameters of the data-driven model. In an embodiment, the method comprises: generating one or more control signals to control a wafer-production process based on defect classifications associated with one or more WDMs.

In an embodiment, a device comprises: image generation circuitry, which, in operation, generates a digital image representation of a wafer defect map (WDM); and convolutional-neural-network (CNN) circuitry, which, in operation, generates a defect classification associated with the WDM based on: the digital image representation of the WDM; and a data-driven model associating WDM images with classes of a defined set of classes of wafer defects, wherein metadata, indicative layer of inspection information, indicative of type of inspection information, or indicative of both layer of inspection information and type of inspection information, is provided to a fully connected layer of the convolutional-neural-network circuitry. In an embodiment, the data-driven model is generated using a data set of training images. In an embodiment, the training images include digital image representations of WDMs. In an embodiment, the training images include artificial wafer defect digital images (AWDIs). In an embodiment, the training images are tagged with an indicator of a defect pattern orientation type. In an embodiment, the training images and/or the images to be evaluated are tagged with the metadata. In an embodiment, the detect pattern orientation type is one of a defined set of defect pattern orientation types. In an embodiment, the defined set of defect pattern orientation types includes a repeater pattern orientation type; a horizontal and vertical pattern orientation type; a mirror pattern orientation type; a specific defect pattern orientation type; and a non-oriented defect pattern orientation type. In an embodiment, the tags are embedded in pixels of the respective training images. In an embodiment, the training images have a first pixel region containing defect patterns and a second pixel region and the tags are embedded in pixels of the second pixel region. In an embodiment, the tags are embedded in pixels of a defined location of the training images. In an embodiment, the defined location does not contain defect patterns of the defined set of classes of wafer defect patterns. In an embodiment, the tags are embedded in comma separated text associated with the respective training images. In an embodiment, the CNN circuitry, in operation, associates, based on the digital image representation of the WDM and the data-driven model, one or more labels and one or more root cause tags with the WDM which are associated with a defect cause. In an embodiment, wherein the CNN circuitry includes one or more convolutional layers. In an embodiment, in a training mode of operation, the CNN circuitry generates the data-driven model using the augmented training data set. In an embodiment, the augmented training data set includes, for each defined class of the set of classes of wafer defects, a same number N of training images.

DETAILED DESCRIPTION

Figure 1:
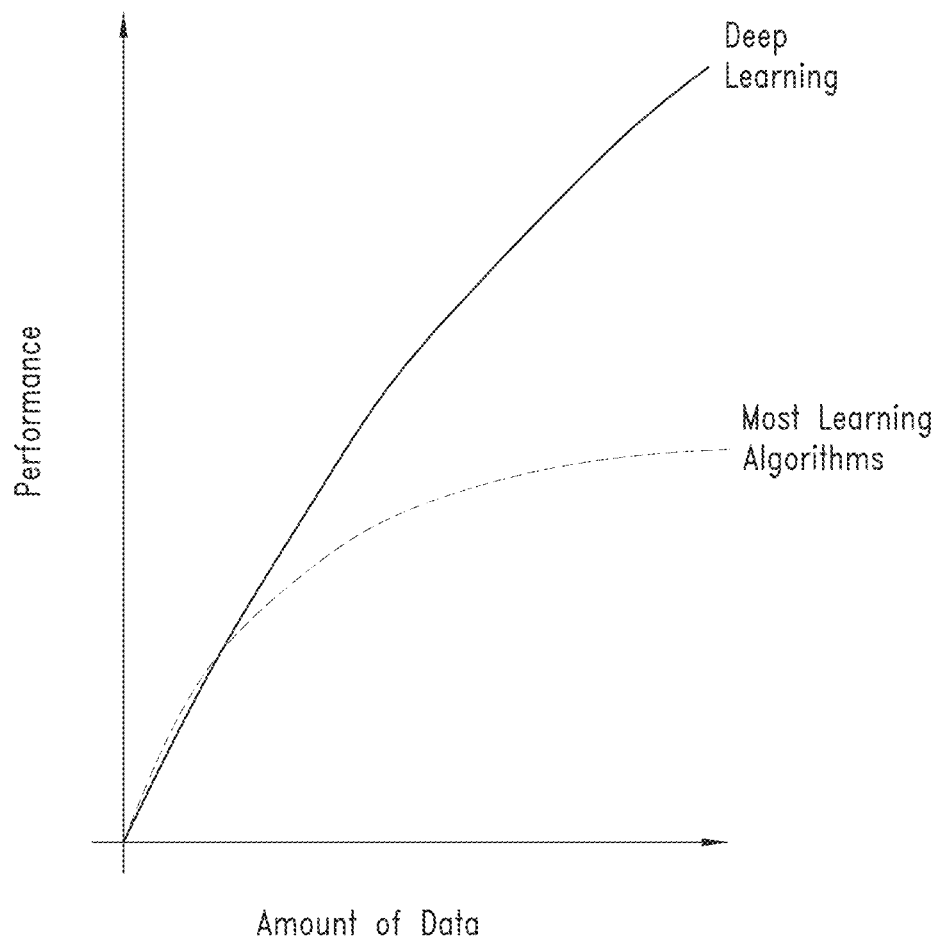
FIG. 1 is a graphical illustration of a relationship between the amount of data provided to learning algorithms and the performance of the algorithms.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, multipliers, adders, dividers, comparators, transistors, integrated circuits, logic gates, finite state machines, convolutional accelerators, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

CNNs generate better predictions when trained using large data sets than they do when trained using small data sets. FIG. 1 is a graphical illustration of the improvement in performance that may typically be obtained in a deep learning system such as a CNN with additional data, and the improvement that may typically be obtained in most other learning systems with additional data. As can be seen, CNNs are data greedy in the sense that generally the more data provided as a training input, the CNN learns better and provides better prediction results.

During a wafer manufacturing process, a statistically significant sampling of wafers may be performed at various steps of the process. For example, after each deposition, etching, stripping, cleaning, etc., process. Individual inspection stations may be added to the processing line to sample the wafers. The wafers may be manually examined using visual inspection. Wafer defect maps may be generated and operators may examine the wafer defect maps and consider additional production parameters.

Figure 2:
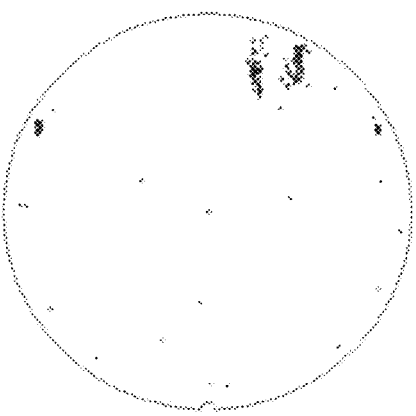
FIG. 2 depicts example wafer defect maps (WDMs).
Figure 2:
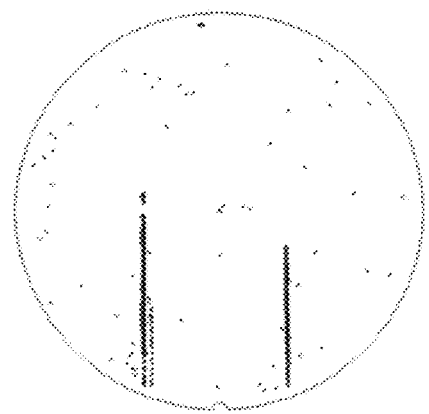
Figure 2:
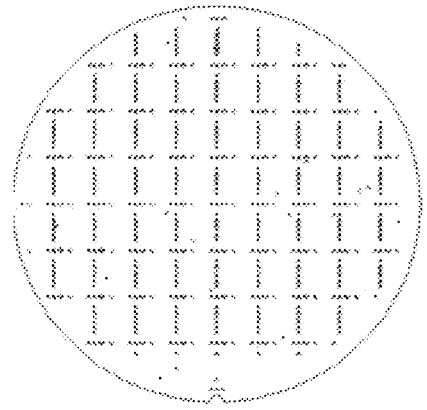

FIG. 2 illustrates example WDMs having defect patterns consistent with various types of manufacturing problems, including, from top to bottom, a pattern presenting fingerprints consistent with a problem due to an incorrect manipulation by an operator, a pattern that has geometric scratches consistent with a problem due to loading or unloading problem with a machine (e.g., a machine handling error), and a pattern presenting a grid or checkboard pattern consistent with a problem during a lithography phase. From the type of pattern in the image, it may be possible to identify the kind of defect (e.g., a scratch), the involved equipment (the particular piece of machinery), the specific process (e.g., etching), and the root cause (e.g., misalignment).

Visual inspection and classification of defects using microscopes may be performed. Based on the inspection, further processing of a lot of wafers or of subsequent lots of wafers may be determined (e.g., dispose of a current lot, proceed with processing of the current lot without restriction, adjust processing of current and subsequent lots, etc., and various combinations thereof). A manual inspection process, however, may be time consuming, may have inconsistencies among operators, and inaccuracies due to human errors, subjectivity and fatigue.

An automated inspection system may generate a wafer defect map containing coordinates of each defect of a wafer die of the sampling. The defect map may take the form of a data file, such as a Klarf file. A WDM may include defect patterns, such as a specific spatial arrangement of defects within the wafer. The patterns may be analyzed to determine a root cause of a defect or defects within the wafer.

For example, clustering algorithms may be employed. Clusters of wafers may be created with maximize intra-class similarity and maximize inter-class diversity. Clustering may be viewed as related to template matching. Disadvantages of a clustering approach include the creation of lots of clusters, the lack of rotational invariance, and the practical inapplicability of clustering to certain defect classes.

In another example, feature extraction with classification based on defined features extracted from the WDMs may be employed. A feature is a discriminative characteristic that a classifier can learn to distinguish WDMs. Features can be Radon-transform based features, Hough-transform based features, geometry-based features, etc. Public labeled data sets may be used for training a classifier. The features, however, are pre-defined, and new features are needed to add new classes.

Deep-learning techniques also may be employed. However, conventionally such techniques are bound to the dimensions of the WDMs, do not distinguish between multiple classes, and may employ thousands of failure patterns and causes. It also may be difficult to avoid distortions introduced by transformations, which may make it difficult to apply overcorrection avoidance techniques.

In addition, the automated approaches discussed above are processor intensive, which may mean these approaches are impractical to implement in real time during a wafer fabrication process.

In an embodiment, WDMs may be generated from representative wafers (e.g., a statistically significant sampling) at various points during a wafer fabrication process. The WDMs are represented as image data and a deep neural network (DNN), such as a convolutional neural network (CNN), employs image classification techniques to identify root causes of defects associated with the wafers. The CNN classification techniques may be deep CNN classification techniques.

A CNN is a computational architecture that attempts to identify underlying relationships in a set of data by using a process that mimics the way the human brain operates. CNNs have the ability of adapting to changing inputs so that a network may produce a result without redesigning the output criteria. CNNs may be used, e.g., to extract patterns and detect trends that may be too complex to be noticed by either humans or other computer techniques.

Figure 3:
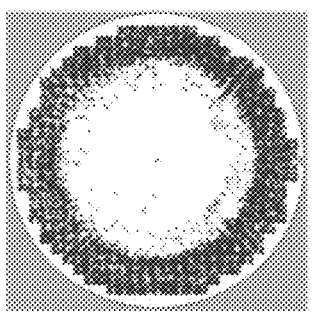
FIG. 3 illustrates an example set of classes into which WDMs may be classified.
Figure 3:
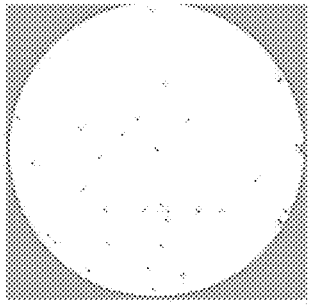
Figure 3:
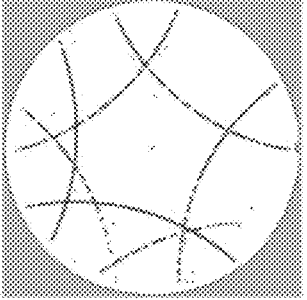
Figure 3:
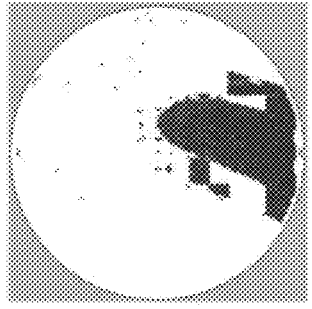
Figure 3:
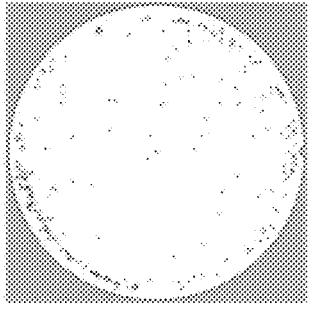
Figure 3:
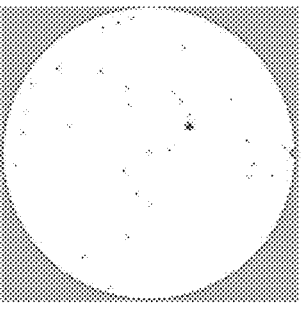
Figure 3:
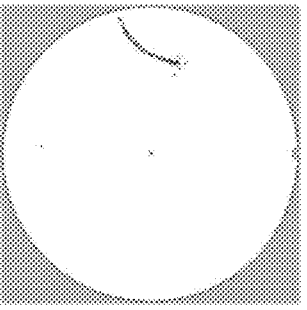

In an embodiment, a training set of WDMs is provided or generated (e.g., from samples taken at various points in the manufacturing process, which are analyzed, and labeled and tagged). FIG. 3 illustrates an example set of defined classes into which WDMs may be classified. As illustrated, the set of classes comprises twelve defined classes including a normal class, a big cluster class, a half-moon class, a donut class, a grid class, a ring class, a fingerprints class, an incomplete class, a geometric scratch class, a small cluster class, a zig-zig class, and a basketball class. The labels identify a class of a defined set of WDM classes (e.g., one of the twelve classes of FIG. 3). The tags identify a root cause associated with WDM of the training set (e.g., a particular problem with a particular machine), and may include other information as well, such as identifiers of the machines used to process the wafer.

The training set of WDMs comprises labeled and tagged WDMs which may be augmented or oversampled to address imbalances in the number of samples of each class and overtraining issues. The WDMs are converted to images which are used to train the CNN. The CNN generates a data-driven model which matches an input WDM to a label corresponding to a class. In an embodiment, the training set also or instead trains the CNN to generate a data-driven model which matches an input WDM to a tag. A testing phase may be employed in which the CNN is tested with a new set of WDMs.

After the training (and testing), WDMs generated during a fabrication process are represented as image data and provided to the CNN. The data-driven model learned by the CNN is used to predict/identify defect root causes of defects associated with the WDMs generated during the fabrication process. For example, the CNN may predict a class (or a plurality of classes) and a tag (or tags) to associate with a WDM produced during a fabrication process using the trained model. In another example, the CNN may predict/identify a class (or a plurality of classes) to associate with a WDM generated during the fabrication process based on the trained model, and use a similarity test to associate a tag of a training WDM having the predicted class(es) which is most similar to the WDM generated during the fabrication process with the WDM generated during the fabrication process. Associating a tag of a most similar training WDM with a WDM generated during a fabrication process facilitates using tags which change after the training (e.g., as new machines are deployed), and avoiding problems which may arise in the generation of training data sets (e.g., only a few machines may generate defective WMDs, leading to a training set of tags which is too small).

The training process of a CNN, such as a deep CNN, to predict classes may produce a model which suffers from overfitting (e.g., the CNN learns from the training set so well that the CNN cannot generalize to new data), or from over-prediction of the majority class (e.g., the CNN is more likely to predict the majority class and yet maintain a high accuracy rate). In addition, representing the WDMs as images can result in large data files (e.g., 20,000 by 20,000 pixel images), which may be difficult to analyze using a CNN. Embodiments may employ various techniques to address or reduce the impact of such issues.

Figure 4:
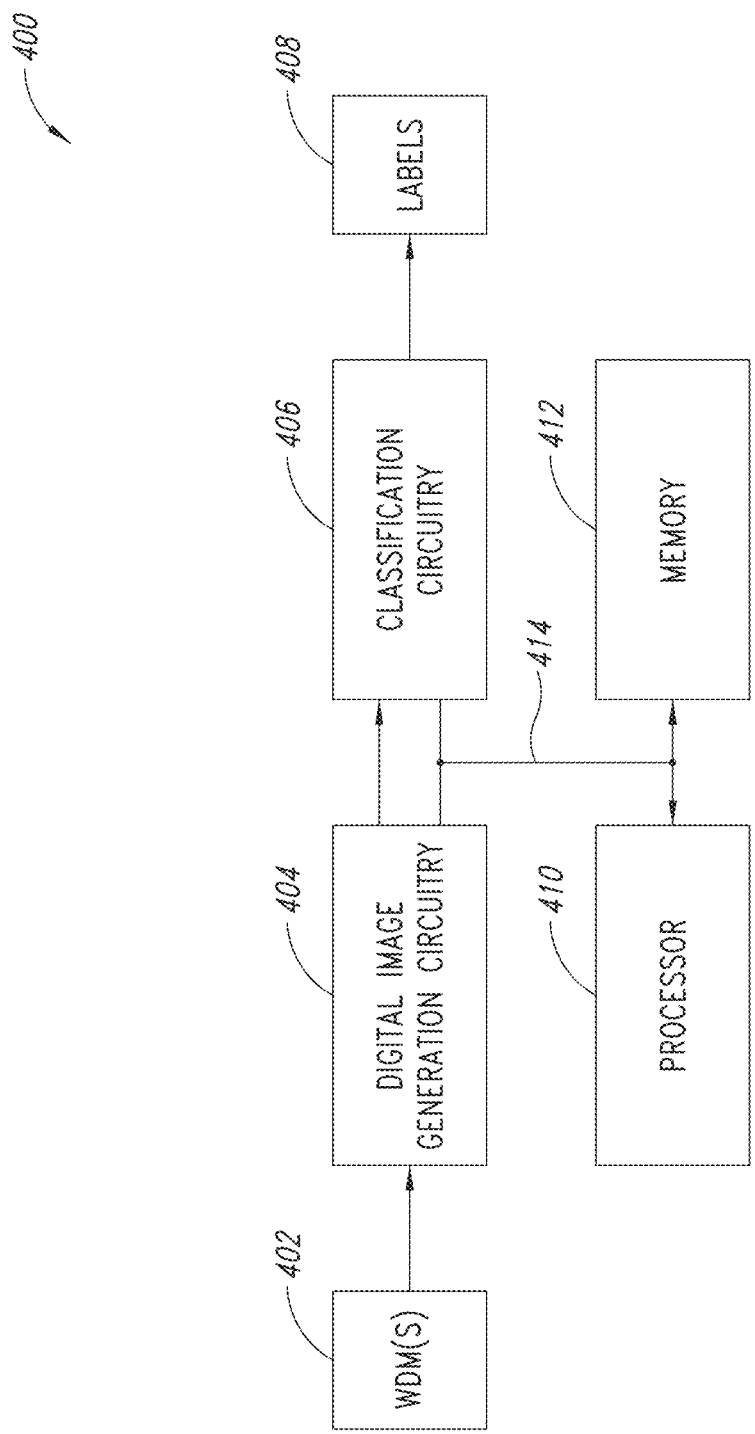
FIG. 4 is a functional block diagram of an embodiment of a WDM classification system.

FIG. 4 illustrates an embodiment of a wafer defect map classification system 400 which automatically classifies wafer defect maps. The system 400 receives a set of WDMs 402 as an input. In a training phase, the set of WDMs 402 have labels (e.g., generated by visual inspection of the WDMs), and tags (e.g., generated in view of the visual inspection, the labels and the analysis of the particular production process). In an embodiment, the tags include wafer defect pattern orientation tags.

Digital image generation circuitry 404 generates a set of digital images from the set of WDMs 402, and in the training phase and a testing phase, may oversample or augment the WDMs. The augmentation may occur prior to generating the set of digital images, which facilitates avoiding distortions that may occur if the augmentation occurred after the image generation process (e.g., if binned image data was augmented). In the training phase, wafer defect pattern orientation tags associated with WDMs may be used to control the augmentation process, and may be removed after the augmentation process and before providing training images to the classification circuitry 406.

In a classification or test phase, the set of digital images is analyzed by classification circuitry 406, which may comprise, for example, a deep CNN, and a set of labels and root cause tags 408 which have a best match to the set of WDMs 402 according to the data-driven model is output by the classification circuitry 406. In some embodiments, the set of root cause tags may be output, while the set of labels is used internally by the CNN (e.g., to determine a root cause tag associated with a training WDM best matching an input WDM). During the training phase, a data driven model is learned by the classification circuitry 406 based on the training set of digital images.

As illustrated, the system 400 comprises one or more processors 410, one or more memories 412, which may be used to implement the functionality of the image generation circuitry 404 and the classification circuitry 406. The system 400 as illustrated also comprises one or more bus systems 414, and may include additional circuitry, such as power supplies, interfaces, etc., which are omitted for ease of illustration. The system 400 may include more components than illustrated, may include fewer components that illustrated, may combine or split components in various manners, and may have configurations other than the illustrated configuration.

Figure 5:
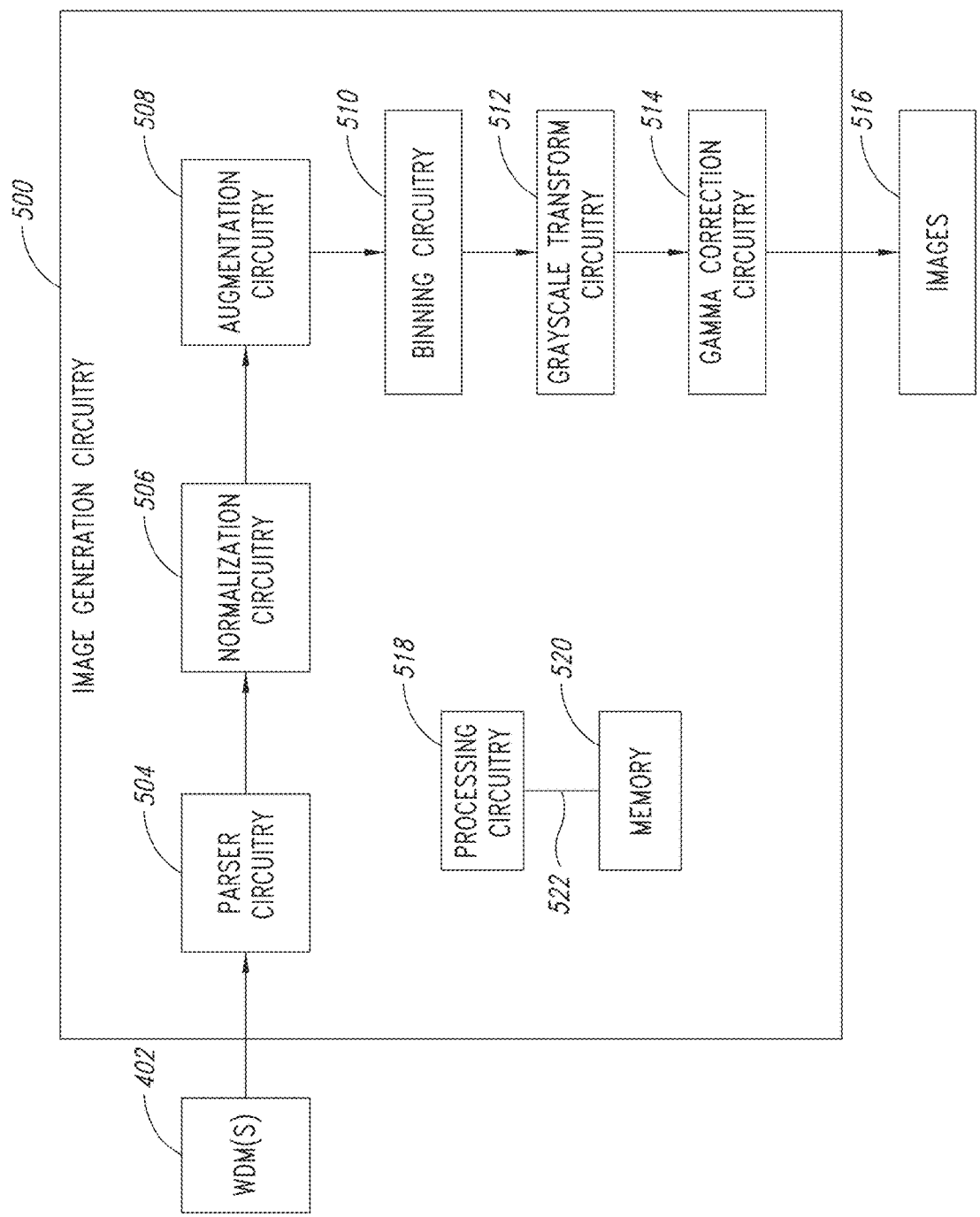
FIG. 5 is a functional block diagram of an embodiment of a WDM to digital image generation system.

FIG. 5 illustrates an embodiment of an image generation system 500, which may be employed, for example, as the digital image generation circuitry 404 in an embodiment of the WDM classification system 400 of FIG. 4. The image generation system 500 as illustrated includes parser circuitry 504, normalization circuitry 506, augmentation circuitry 508, binning circuitry 510, grayscale transform circuitry 512, and gamma correction circuitry 514. In a training mode of operation, the system 500 receives a set of training WDMs 402 as an input and outputs an augmented set of WDM training images 516. As illustrated, the system 500 comprises processing circuitry such as one or more processors 518, and one or more memories 520, which may be used to implement the functionality of the parser circuitry 504, normalization circuitry 506, augmentation circuitry 508, binning circuitry 510, grayscale transform circuitry 512 and gamma correction circuitry 514. In a classification or test mode of operation, the system 500 produces digital image representations of input WDMs. The system 500 as illustrated also comprises one or more bus systems 522 (portions of which are omitted for ease of illustration), and may include additional circuitry, such as power supplies, interfaces, etc., which are omitted for ease of illustration.

In an embodiment, the input set of WDMs 402 contains a set of text files in which the coordinates of defects are stored (e.g., Klarf files). The parser circuitry 502, in operation, opens the text files and produces a set of comma separated value (csv) files. The set of csv files may preserve the context information (e.g., the class labels, root cause tags and wafer defect pattern orientation type tags).

The normalization circuitry 506, in operation, normalizes the coordinates with respect to the center of the wafer, and with respect to the radius of the wafer. For example the following relationships may be employed to generate normalized coordinates x', y' from the input coordinates, $$x = (x_{index} \cdot x_{die} + x_{rel}) - x_c$$

$$y = (y_{index} \cdot y_{die} + y_{rel}) - y_c$$

$$x' = x/\text{radius}$$

$$y' = y/\text{radius}$$

where $x_{index}$ and $y_{index}$ are the number of dies to count in the horizontal and vertical directions from a die that contains the center of the wafer; $x_{rel}$, $y_{rel}$ are defect coordinates with respect to a bottom-left point of a die identified by $x_{index}$, $y_{index}$; $x_{die}$, $y_{die}$ are the size of the die (width, height), and can be viewed as a die pitch; and $x_c$, $y_c$ are the coordinates of the center with respect to a bottom-left point of the die containing the center.

Normalization facilitates classifying WDMs of wafers of various sizes in a manner which does not need to consider the size of the wafer or the resolution of the WDM.

The augmentation circuitry 508, is used in the training and testing phases, and, in operation, generates plausible WDMs from the input set of training WDMs (e.g., with the normalized coordinates). In some embodiments, the input set of training WDMs may have already been parsed and normalized, and may be provided to the augmentation circuitry 508.

Data augmentation facilitates avoiding overfitting, overprediction of the dominant class and imbalanced datasets. In an embodiment, transforms may be employed to generate fictitious WDMs from the input set of training WDMs. The transforms employed may preserve the labels and tags of the source WDMs of the training set of data. In an embodiment, the wafer defect pattern orientation tags of the WDMs may be exploited to select specific WDM transforms which preserve the pattern information in the WDM used to generate the data-driven model (e.g., the patterns which classification circuitry, such as the classification circuitry 406 of FIG. 4, uses to generate the data driven model).

Transforms such as rotations, symmetries, flips, shifts, etc., may be performed and may be selected, for example, based on the wafer defect pattern orientation tags of the respective WDMs. In an embodiment, the orientation tags may not be preserved during the augmentation process (e.g., the orientation tags may be removed from the source WDMs and either not generated for the augmented WDMs or removed from the augmented data set before outputting the augmented WDM training image data set to the classifier) or may simply be ignored during further processing (e.g., the classification circuitry 406 may not consider the orientation tags associated with WDMs of the augmented training data set).

WDMs may have different types of orientations of the defect patterns of the WDM. Some classes of patterns have orientations, but the orientations are not always the same for a class or for a root cause. Thus, class labels alone, or class and root clause tags in combination, are not always good indicators of transforms which will preserve the useful pattern information in the WDM used to classify the WDM or to train the classifier.

Figure 6:
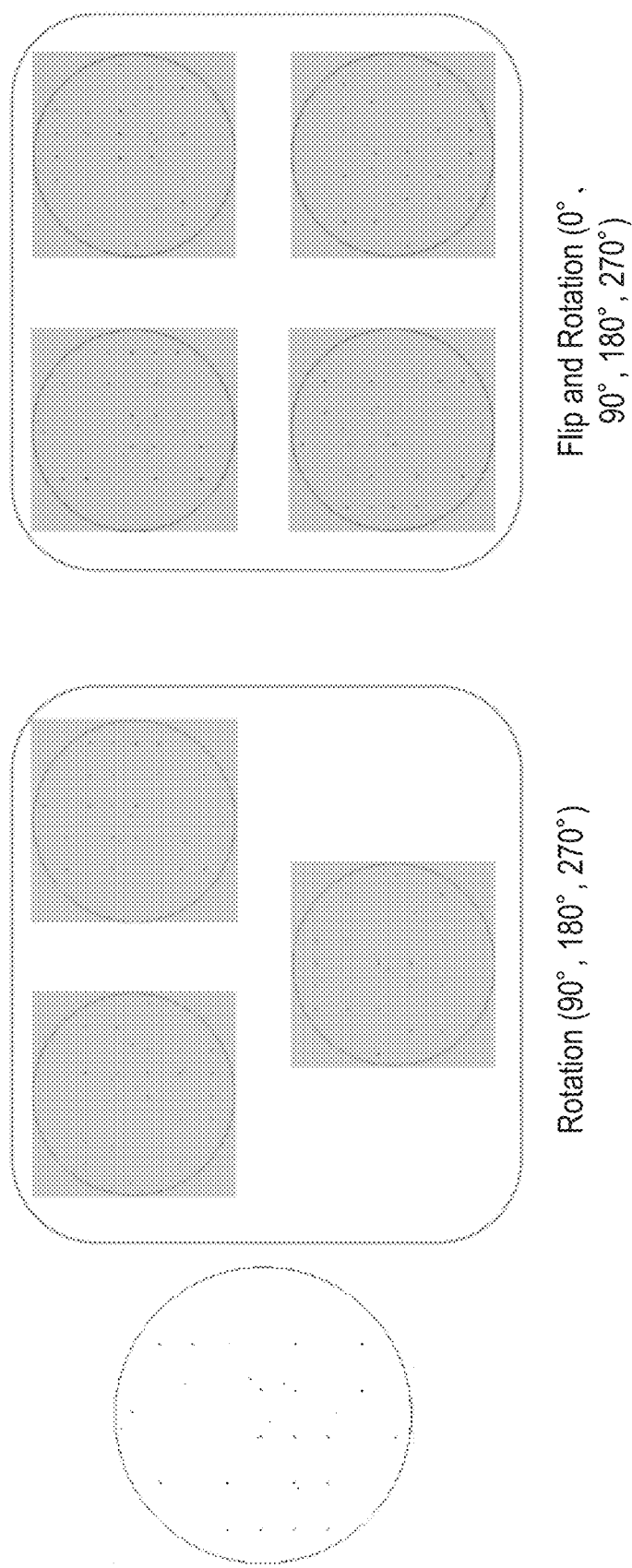
FIGS. 6 to 9 illustrate various example WDM wafer defect pattern orientation types and corresponding transforms which preserve the useful pattern information of the WDMs.

FIG. 6 illustrates an example of one type of wafer defect pattern orientation of the defect patterns of a WDM, a repeater orientation, and a set of augmented WDMs that may be generated from a WDM having a pattern with a repeater orientation. WDMs having patterns with a repeater orientation may be augmented using rotations of 0, 90, 180 and 270 degrees, and random flips. Thus, eight training images may be generated and included in an augmented training data set based on a single input WDM having a pattern with a repeater orientation, the original image (the left image in FIG. 6), images generated from rotation of the WDM by 90, 180 or 270 degrees (the three center images in FIG. 6), and images generated from a flip and rotation of the WDM by 0, 90, 180 or 270 degrees (the four images on the right in FIG. 6).

Figure 7:
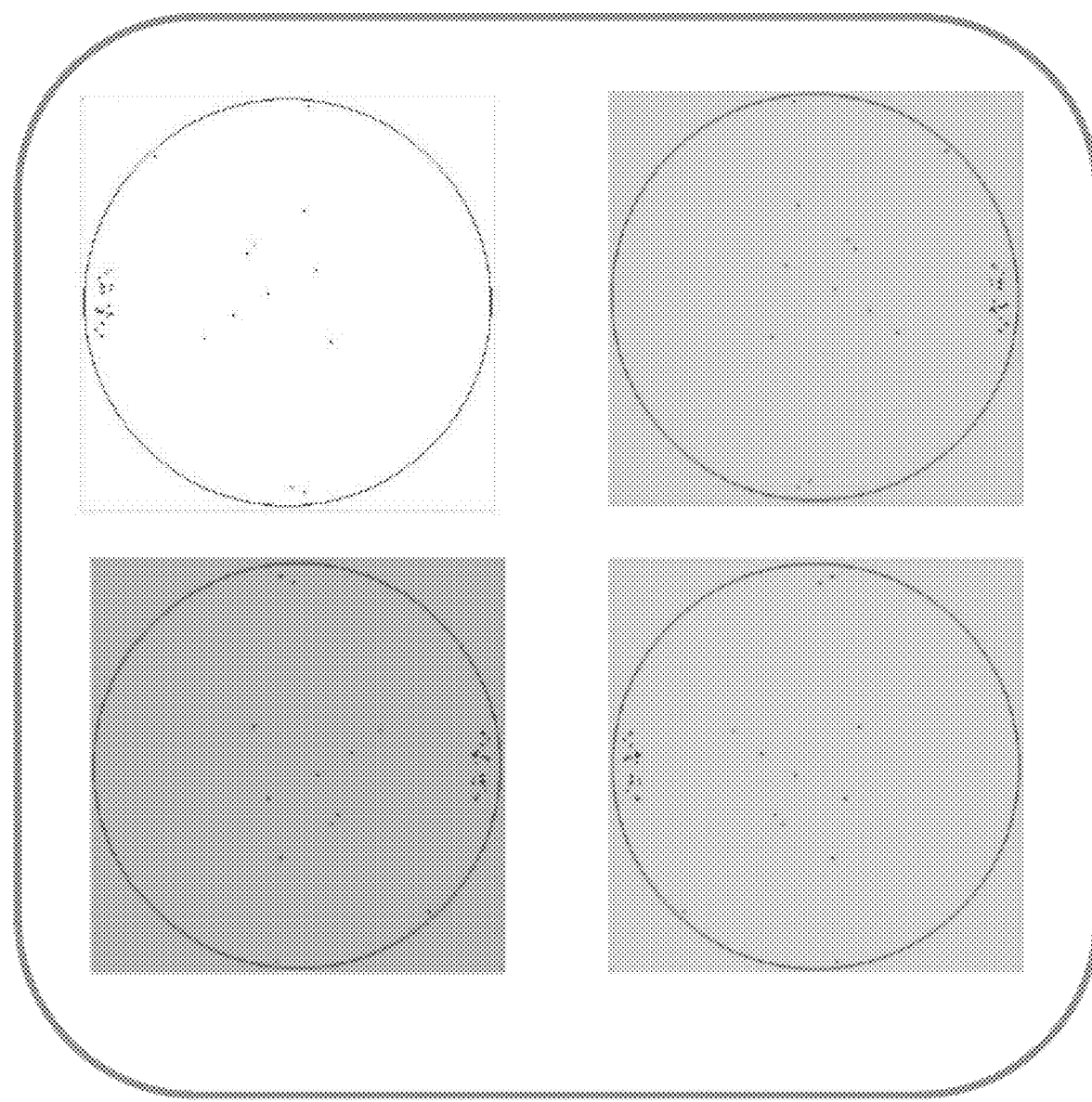

FIG. 7 illustrates an example of another type of wafer defect pattern orientation of a WDM, a horizontal and vertical orientation, and a set of augmented WDMs that may be generated from a WDM having a pattern with a horizontal and vertical orientation. WDMs having a pattern with a horizontal and vertical orientation may be augmented using rotations of 0 and 180 and random flips. Thus, four training images may be generated from a single input WDM having a pattern with a horizontal and vertical orientation, the original image, an image generated from rotation of the WDM by 180 degrees, and images generated from a flip and rotation of the WDM by 0 or 180 degrees. The other types of transforms generally would not preserve the information in the WDM which the CNN may use to classify the WDMs having a pattern with a horizontal and vertical orientation. Thus, in an embodiment, those types of transforms are not employed for WDMs having a horizontal and vertical defect pattern orientation type.

Figure 8:
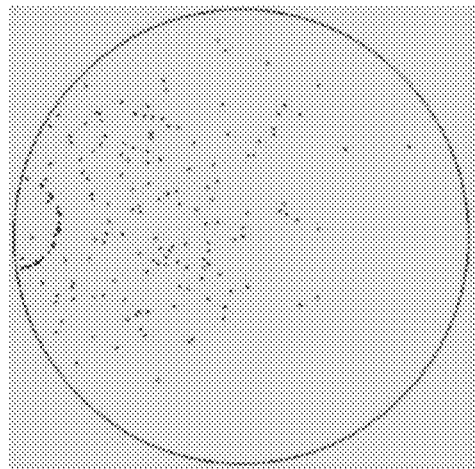
Figure 8:
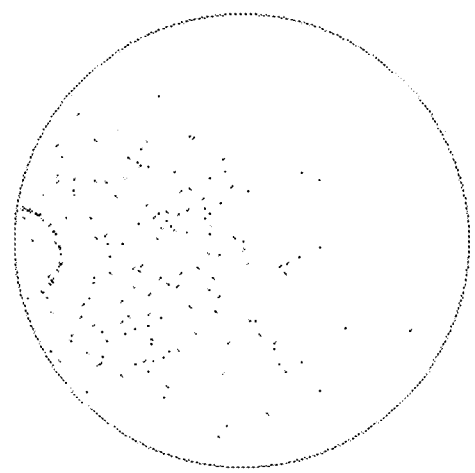

FIG. 8 illustrates an example of another type of orientation of a defect pattern of a WDM, a mirror orientation, and a set of augmented WDMs that may be generated from a WDM having a defect pattern with a mirror orientation. WDMs having a mirror orientation defect pattern may be augmented using a random flip across a vertical axis. Thus, two training images may be generated from a single input WDM having a defect pattern with a mirror orientation, the original image, and an image generated by flipping the WDM across the vertical axis. The other types of transforms generally would not preserve the information in the WDM which the CNN may use to classify the WDMs having a pattern with a mirror orientation.

Figure 9:
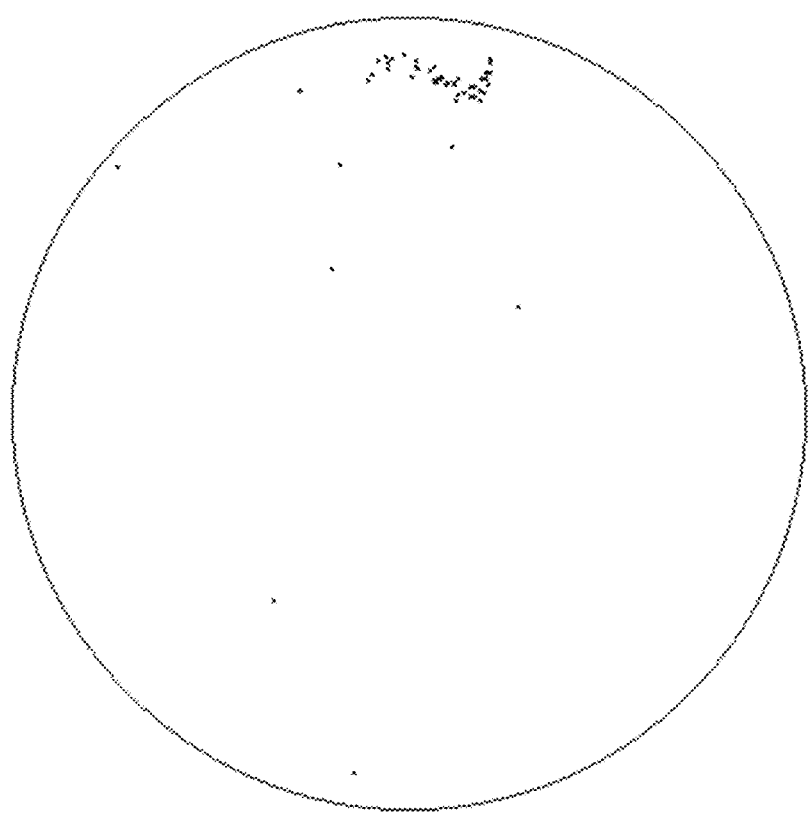

FIG. 9 illustrates an example of another type of orientation of a defect pattern of a WDM, a specific orientation pattern which when transformed generally does not preserve the information in the WDM which the CNN may use to classify the WDM. For WDMs having a specific wafer defect orientation pattern, a single training image (e.g., the original image) may be output by a transform augmentation process since using transforms would generally destroy the useful information. As illustrated, the specific orientation pattern is near the lasermark at the top of the wafer, and has a characteristic wave on the right side. Flipping or rotating the WDM generally would not preserve the useful information in the pattern. Other types of augmentation may be employed (e.g., the addition of random noise).

Figure 10:
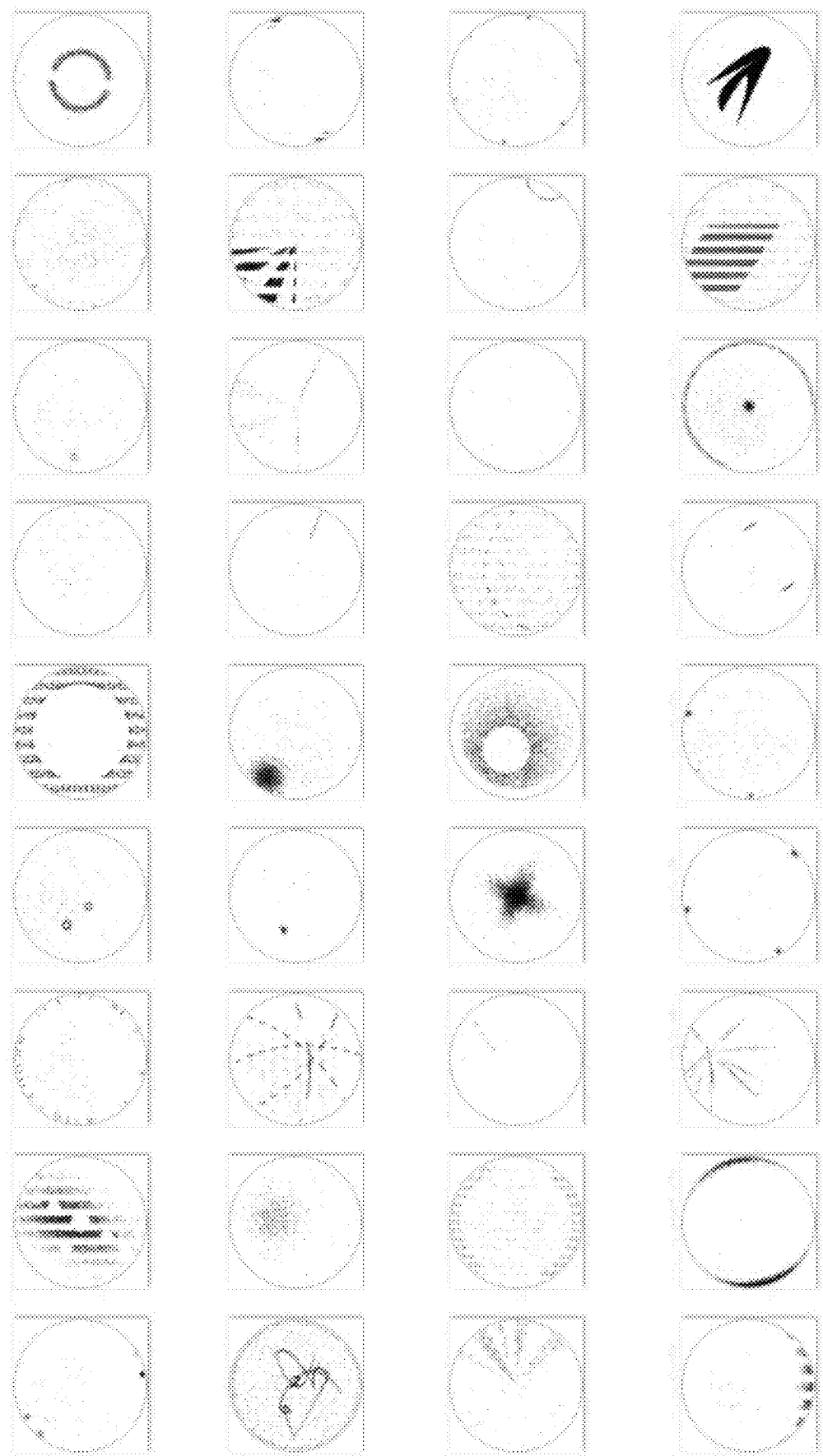
FIG. 10 illustrates example WDMs and example artificial wafer defect images (AWDIs) which have non-oriented wafer defect patterns.

Not all WDMs have wafer defects with oriented patterns. FIG. 10 illustrates examples of WDMs (or of artificial wafer defect images (AWDIs), discussed in more detail below) which do not have wafer defects with oriented patterns. Typically, around 75% of the defect patterns of WDMs are non-oriented wafer defect orientation patterns. WDMs having a non-oriented defect pattern may be augmented using a random flip and a random rotation (e.g., from 0 degrees to 360 degrees). Thus, an infinite number of images may be generated from a single input WDM having a defect pattern which is non-oriented, the original image, and a determined number of images based on random flips and random rotations of the original image. For example, a sufficient number of augmented images may be generated to avoid reuse of any of the augmented images corresponding to a WDM having non-oriented pattern in a set of training data provided to a CNN for an epoch of training.

As mentioned above, in an embodiment fictitious random defects (e.g., noise) may be added to the WDMs to augment the WDMs for use in training and testing, in addition to, in combination with, or instead of, applying one or more transforms. For example, when a WDM has a pattern which when transformed does not preserve the useful information in the WDM (e.g., a specific orientation pattern type, see FIG. 9), random noise may be added to WDM to generate additional training images, without augmenting the WDM using transforms. In another example, when a WDM has mirror orientation pattern type (see FIG. 8), one augmenting WDM may be generated by flipping the input WDM across the vertical axis, and a plurality of augmenting WDMs may be generated by adding random noise to the original WDM and to the flipped WDM.

A set of fictitious random defects may be randomly selected from a plurality of sets of fictitious random defects. A random number of defects may be added, and selected according to an empirically derived distribution. Adding noise to the augmented WDMs facilitates training the classifier using an augmented training set of WDMs having a more realistic distribution of noise. Fictitious random defects may be added using transforms in an embodiment.

The binning circuitry 510, in operation, quantizes the WDMs into images. Data binning or bucketing is a data process technique used to group continuous input data into a smaller number of bins or intervals of discrete values. The output size depends on how many bins are employed. More bins means that a region considered for each bin is smaller. Binning may facilitate reducing the amount of data to be processed by the classification circuitry (see classification circuitry 406 of FIG. 4) and may reduce the size of the output image. The original data values of a WDM are replaced by a count of defects that fall into a small region, or bin, of the WDM. Fixed binning, where the size of each bin is fixed, or adaptive binning may be employed. In fixed binning, the wafer map may be divided into a uniformly spaced grid.

In adaptive binning, the wafer is split into intervals of different dimensions with the expected value of defects constant in each bin. The size of each bin is inversely proportional to the density of defects and smaller bins are used to describe high-density defect regions of the WDM, which results in higher resolution images. Adaptive binning reflects that defects may be more dense in some regions of the WDMs (e.g., at the center and at the edges), and creates smaller bins where the defect density is higher. A more general solution, which may be applied in an embodiment, is to directly learn the binning layout to maximize the defect-detection performance on a given training set. In an embodiment, the learning problem may be formulated as learning the number of bins or the density values in each bin. Adaptive binning facilitates detecting some types of defects, such as the incomplete class, which may have defects at positions at the wafer borders, such as fixed positions.

The grayscale transform circuitry 512, in operation, transforms the image generated by the binning circuitry 510 into a grayscale image with values in the range of [0, 1]. A saturation threshold s is set, for example based on the output size (a number of bits available to represent a bin count). For example, the saturation threshold may be set at 255. Values of an image (e.g., a count value of a bin) generated by the binning circuitry which are above the saturation threshold s are replaced by 1. Values below the saturation threshold s are linearly scaled. The output of the grayscale transformation circuitry is a grayscale image.

The gamma correction circuitry 514 enhances the contrast by, in operation, applying a transform to each value. For example, the following transform may be applied:

$$V = v^\gamma, \gamma \leq 1$$

where v is a count value of a bin, gamma $\gamma$ is a transform parameter, and V is a transformed count value of a bin. In an embodiment, the saturation parameter s and the transform parameter $\gamma$ may be manually selected. In an embodiment, the classifier may learn to select its own thresholds. For example, the saturation parameter s may be set to 255, and additional convolutional layers (e.g., two layers) may be added to the CNN so that the model learns a contrast enhancement function. Having the model learn the contrast enhancement function from the data facilitates using different images sizes, as different thresholds do not need to be studied for manual selection using different image sizes.

The output of the image generation system is a set of one or more images, which are provided as an input to a classification system, such as the classification circuitry 406 of FIG. 4.

Embodiments of the image generation system 500 may comprise more or fewer circuits than illustrated, and circuits may be combined and separated into additional circuits in various manners. For example, some embodiments of the image generation system 500 may omit the gamma correction circuitry 514 and image enhancement, if desired, may be performed in a classification system such as the classification circuitry 406 of FIG. 4. Some embodiments may perform image enhancement in both an image generation system and a classification system. In another example, the image generation system 500 may include resampling circuitry instead of or in addition to the augmentation circuitry 508.

Figure 11:
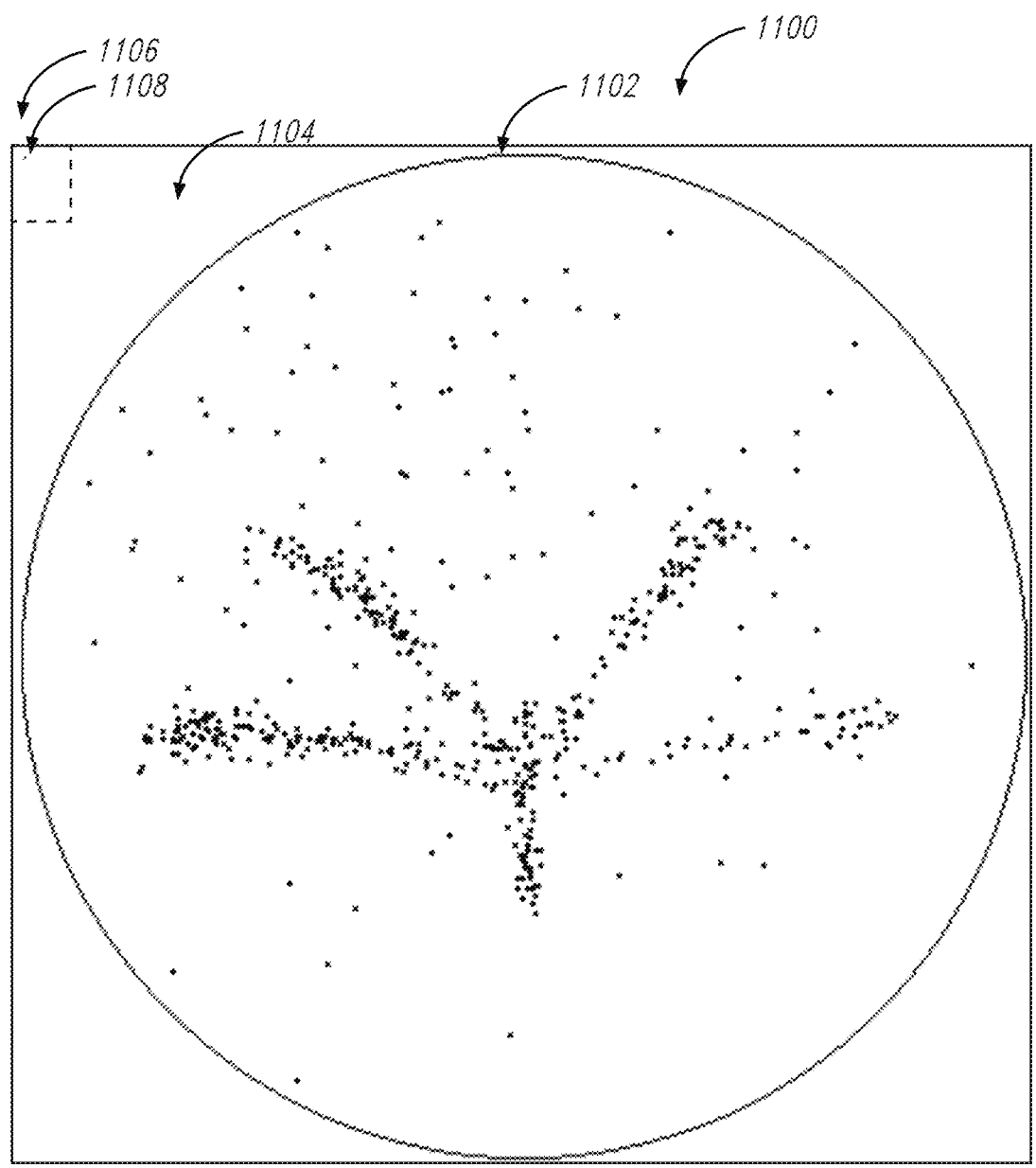
FIG. 11 illustrates an example of embedding a wafer defect pattern orientation tag in a WDM image or in an AWDI as a pixel pattern.

A WDM may be tagged with a wafer defect pattern orientation tag in various manners. For example, wafer defect pattern orientation tags may be included as comma separated text in a Klarf file, as discussed above with respect to root cause tags. FIG. 11 illustrates an embodiment of embedding a wafer defect pattern orientation tag in a WDM image (or in an AWDI image) 1100 as a pixel pattern. The WDM 1100 includes a first portion 1102, which has defect patterns that are useful in the training of a classifier, such as the classifier 406 of FIG. 4, and a second portion 1104, which may contain defect patterns that are less useful or ignored in the classification of the WDM (e.g., portions which are typically disregarded by the classifier as not containing any information useful to determining the class of the WDM; portions which are not expected to have defect patterns of a defined set of classes of wafer defect patterns, etc.). A wafer defect pattern orientation tag is embedded in a determined location 1106 of the second portion 1104 as a pixel pattern 1108 indicative of a wafer defect pattern orientation of the WDM 1100. In the context of an artificial wafer defect image (discussed in more detail below), an artificial defect pattern orientation tag may be embedded in a portion of an artificial wafer defect image which does not contain artificial defect patterns. Other types of information may be embedded in pixel patterns in an image, such as metadata associated with a WDM or with an AWDI.

Figure 12:
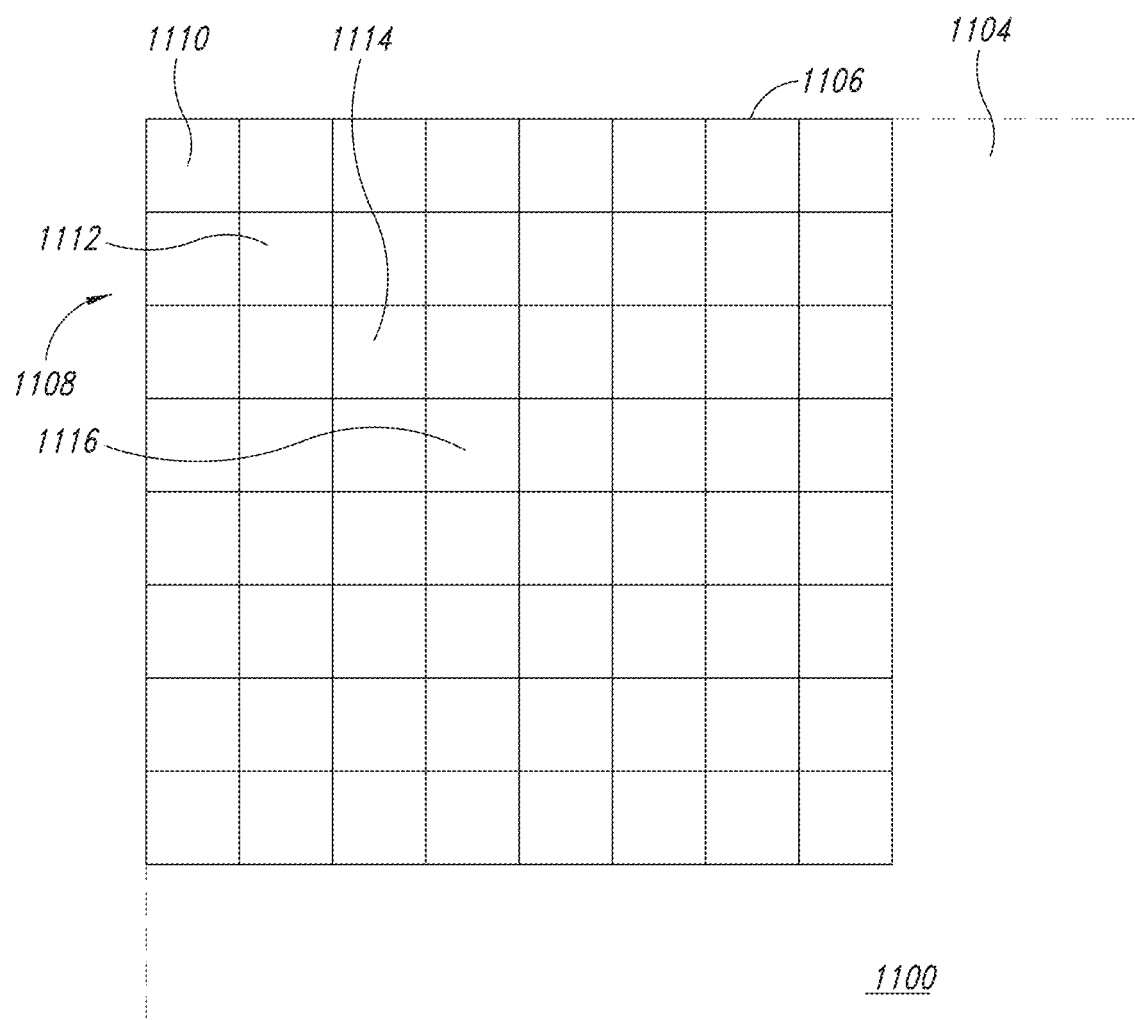
FIG. 12 illustrates an example pixel pattern scheme that may be employed to embed a wafer defect pattern orientation tag in pixels of a WDM image or in pixels of an AWDI image.

FIG. 12 illustrates an example pixel pattern encoding scheme that may be employed, for example, in the embodiment of FIG. 11 to embed a wafer defect pattern orientation tag in a WDM or in an AWDI. As illustrated, the determined location 1106 of the second portion 1104 is a block of 64 pixels in the upper-left corner of the WDM 1100. Pixels 1110, 1112, 1114 and 1116 are used to embed a pixel pattern 1108 indicative of a wafer defect pattern orientation of the WDM 1100 into the WDM image.

For example: if all four pixels 1110, 1112, 1114 and 1116 are white, the embedded tag may indicate a first type of wafer defect pattern orientation (e.g., a non-oriented type); if the pixel 1110 is black, and the pixels 1112, 1114 and 1116 are white, the embedded tag may indicate a second type of wafer defect pattern orientation (e.g., a repeater type); if the pixels 1110 and 1112 are black, and the pixels 1114 and 1116 are white, the embedded tag may indicate a third type of wafer defect pattern orientation (e.g., horizontal and vertical type); if the pixels 1110, 1112 and 1114 are black, and the pixel 1116 is white, the embedded tag may indicate a fourth type of wafer defect pattern orientation (e.g., a mirror type); and if all four pixels 1110, 1112, 1114 and 1116 are black, the embedded tag may indicate a fifth type of wafer defect pattern orientation (e.g., a no flip or rotation type). Other determined locations 1106 and pixel pattern encoding schemes may be employed (e.g., pixel encoding based on blocks of pixels).

In an embodiment, class labels and other tags (e.g., root cause tags) may also be embedded in the training images. For example, pixel patterns indicative of class labels and root causes may be embedded in respective determined locations in the region 1104 of the WDM 1100. This may facilitate simplifying the analyzing and tagging process, for example, by allowing the analyzing and tagging to take place after images are created from text files (e.g., Klarf files), or by avoiding the use of text files and simply processing WDM images.

Figure 13:
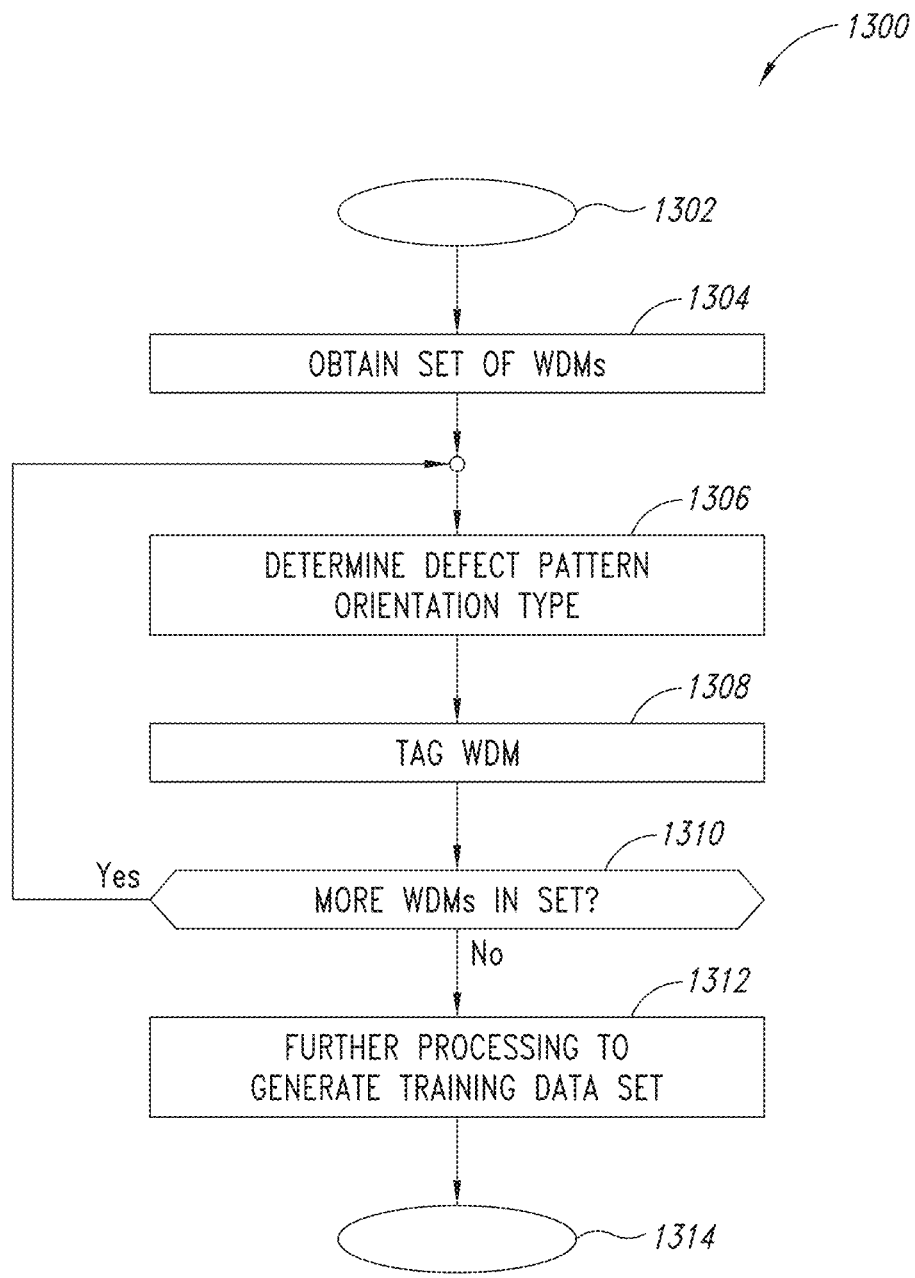
FIG. 13 illustrates an embodiment of a method of tagging a set of WDMs to indicate wafer defect pattern orientations of the WDMs.

FIG. 13 illustrates an example embodiment of a method 1300 of tagging a set of WDM training data to indicate wafer defect pattern orientation types of the WDMs of the set. The method 1300 may be employed by, for example, the system 400 of FIG. 4, the system 500 of FIG. 5 or the system 2100 of FIG. 21.

The method 1300 starts at 1302. The method 1300 may be started, for example, as part of a wafer manufacturing quality control process. The method 1300 proceeds from 1302 to 1304.

At 1304, the method 1300 obtains WDMs for a plurality of defect classes to use in generating a training set of data. The WDMs may be obtained from, for example, a wafer manufacturing system or retrieved from a database. The method 1300 proceeds from 1304 to 1306.

At 1306, a WDM in the set of WDMs is analyzed and evaluated to determine an orientation type of the wafer defect pattern of the WDM. For example, a WDM may be manually inspected to determine an orientation type of the wafer defect pattern of the WDM. This may typically be done on a class by class basis. The method 1300 proceeds from 1306 to 1308.

At 1308, the WDM is tagged to indicate the WDM has the determined wafer defect pattern orientation type. This may be done, for example, by including a wafer defect pattern orientation tag as text in a Klarf file, by embedding a pixel pattern indicative of the wafer defect pattern orientation type in an image of the WDM, etc., and various combinations thereof. The method 1300 proceeds from 1308 to 1310.

At 1310, the method determines whether there are more WDMs in the obtained set of WDMs to be processed. When it is determined at 1310 that there are more WDMs in the obtained set of WDMs to be processed (Yes at 1310), the method 1300 returns to 1306 to process another WDM in the obtained set of WDMs. When it is determined at 1310 that there are no more WDMs of the obtained set of WDMs to be processed (No at 1310), the method 1300 proceeds to 1312, where optional further processing associated with generating a set of training data may be performed, such as augmenting the tagged set of WDMs based on the wafer defect pattern orientation types of the tagged set of WDMs. The method 1300 proceeds from 1312 to 1314, where further system processing may occur.

Embodiments of methods of tagging a set of WDMs to indicate wafer defect pattern orientations of the WDMs of the set of WDMs may contain additional acts not shown in FIG. 13, may not contain all of the acts shown in FIG. 13, may perform acts shown in FIG. 13 in various orders, and may be modified in various respects. For example, the method 1300 may analyze the WDMs to determine other characteristics of the WDMs at act 1306 (e.g., classes and root cause tags) and to label and tag the WDMs with indicators of these other characteristics at act 1308. In some embodiments, pixel patterns may be added to the WDMs to tag the WDMs with indicators of the other characteristics (e.g., in respective determined locations of the portion 1104 of the WDM 1100 of FIG. 11). In another example, the set of WDMs may be tagged in parallel at 1308 rather than sequentially.

Figure 14:
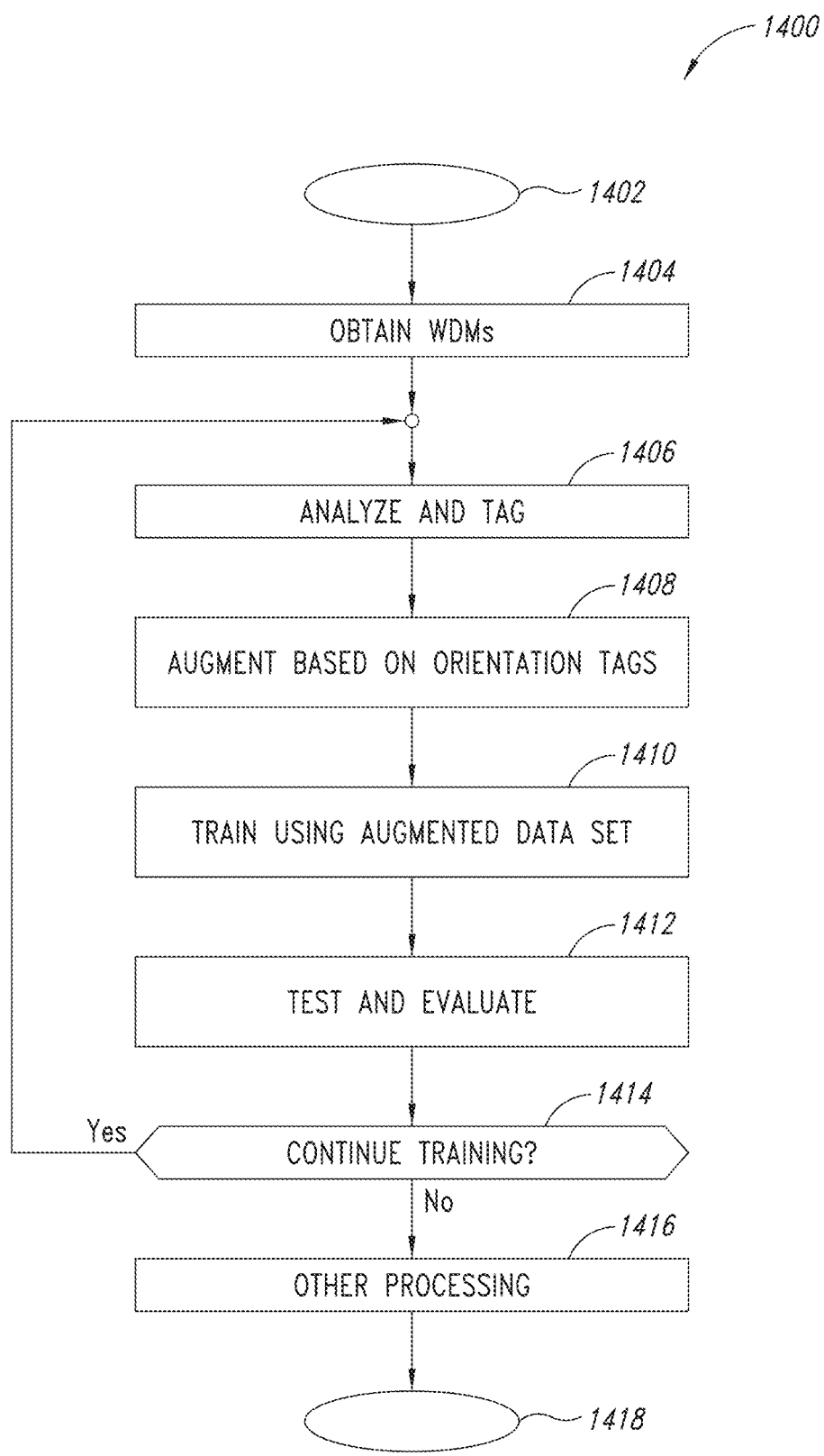
FIG. 14 illustrates an embodiment of a method of training a classifier using a set of WDM training images.
Figure 21:
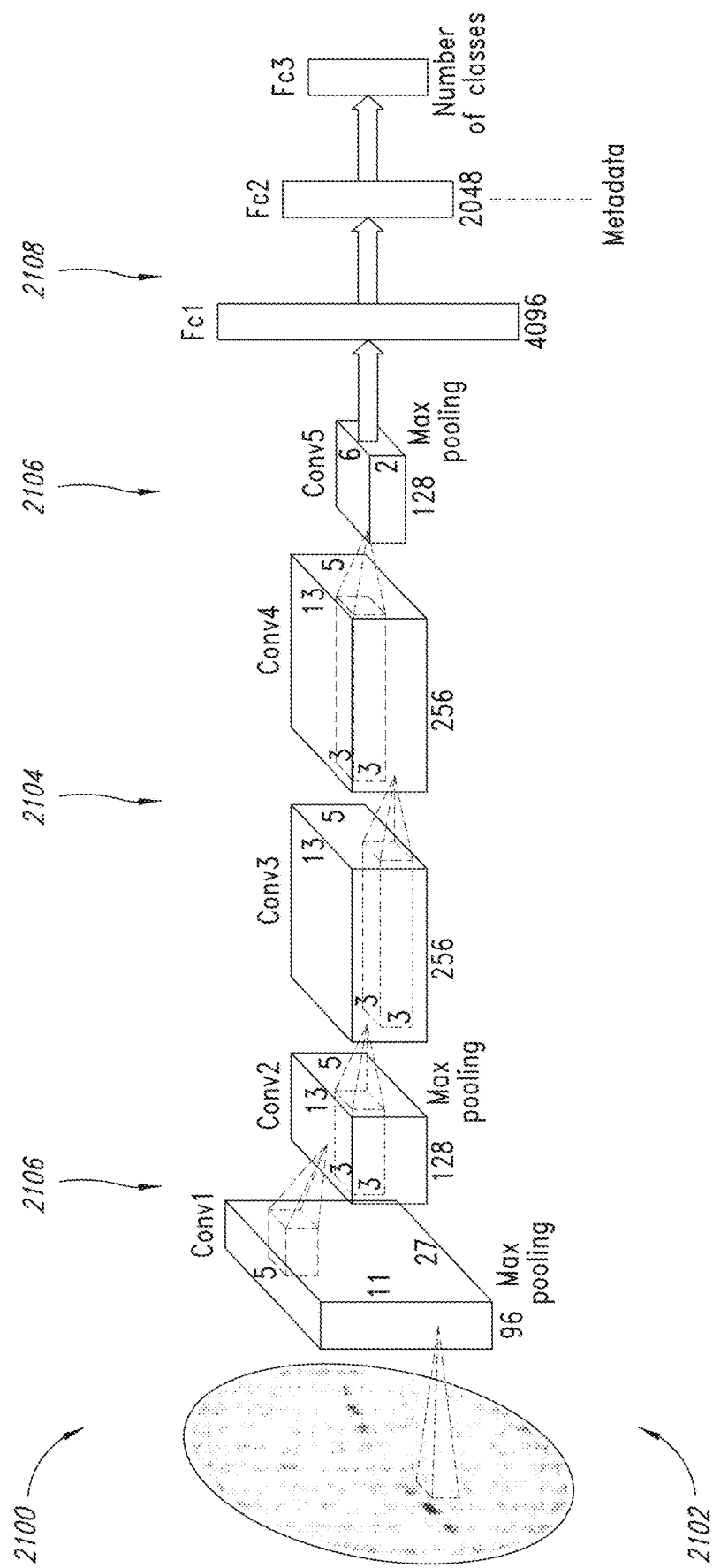
FIG. 21 is a functional block diagram of an embodiment of a WDM image classification system.

FIG. 14 illustrates an example embodiment of a method 1400 of training a classifier using an augmented data set, which may be employed, for example, by the system 400 of FIG. 4, or the system 2100 of FIG. 21. The method 1400 starts at 1402. The method 1400 may be started, for example, as part of a wafer manufacturing quality control process. The method 1400 proceeds from 1402 to 1404.

At 1404, the method 1400 obtains wafer defect maps for a plurality of defect classes. The WDMs may be obtained from, for example, a wafer manufacturing system, retrieved from a memory, etc. The method 1400 proceeds from 1404 to 1406.

At 1406, the WDMs are analyzed, labeled and tagged. For example, WDMs are analyzed, characteristic patterns of the defect classes are identified, root defect causes are determined and wafer defect pattern orientation types are determined, and the WDMs are labeled and tagged in accordance therewith. An embodiment of the method 1300 of FIG. 13 may be employed to analyze, label and tag the WDMs. The method 1400 proceeds from 1406 to 1408.

At 1408, the set of WDMs is augmented by selectively applying transforms to WDMs of the obtained set of WDMs based on tags indicative of the wafer defect pattern orientation types of the WDMs. For example, the embodiment of the method 1500 of FIG. 15 may be employed to augment the obtained set of WDMs. The method proceeds from 1408 to 1410.

At 1410, the method 1400 trains the classification system using the augmented data set. The method 1400 proceeds from 1410 to 1412. At 1412, the method 1400 processes test or actual data using the trained classifier and evaluates the results to determine how accurately the trained classifier classified the test or actual data. In an embodiment, the tags indicative of the wafer defect pattern orientation types may be removed prior to the training or otherwise not considered during the training to avoid introducing a bias based on the wafer defect pattern orientation tags (e.g., based on a pixel patterns embedded in the WDMs, see FIGS. 11 and 12). The method 1400 proceeds from 1412 to 1414.

At 1414, the method 1400 determines whether training of the classifier should continue, for example based on whether the results are sufficiently accurate, whether a sufficient number of training loops have been performed, etc. This may be done for each class, for a group of classes, or for all of the classes. Statistical analysis may be employed. When it is determined at 1414 that the training should continue (Yes at 1414), the method returns to 1406, where the evaluation of the WDMs, the augmentation procedures, etc., may be modified to take into account the evaluation of the results at 1412. For example, the results may indicate that a new class should be added, that additional or different augmentation processes should be performed, etc. When it is determined at 1414 that the training is complete (No at 1414), the method 1400 proceeds to 1416, where further processing associated with the training may be performed, such as storing weights and parameters associated with the classifier.

In an embodiment, the training is performed in several loops, and the augmentation performed on a WDM of the set of WDMs varies between the loops. For example, in a first training loop, a first type of augmentation may be performed on a WDM, and that augmented WDM used to train the model in the first loop. In a second training loop, a second type of augmentation is performed on the WDM, and that augmented WDM is used to train the model in the second loop, etc. In this manner, the training uses different WDMs in each training loop. In an embodiment, the wafer defect orientation tag of a WDM may be modified to indicate the type of augmentation process to be performed in a next loop.

The method 1400 proceeds from 1416 to 1418, where further system processing may occur.

Embodiments of methods of training a classifier may contain additional acts not shown in FIG. 14, may not contain all of the acts shown in FIG. 14, may perform acts shown in FIG. 14 in various orders, and may be modified in various respects. For example, the method 1400 may separate act 1406 in some embodiments, for example, by analyzing and tagging the WDM to indicate the wafer defect pattern orientation type prior to analyzing and labeling the classes and tagging the root causes, etc.

Figure 15:
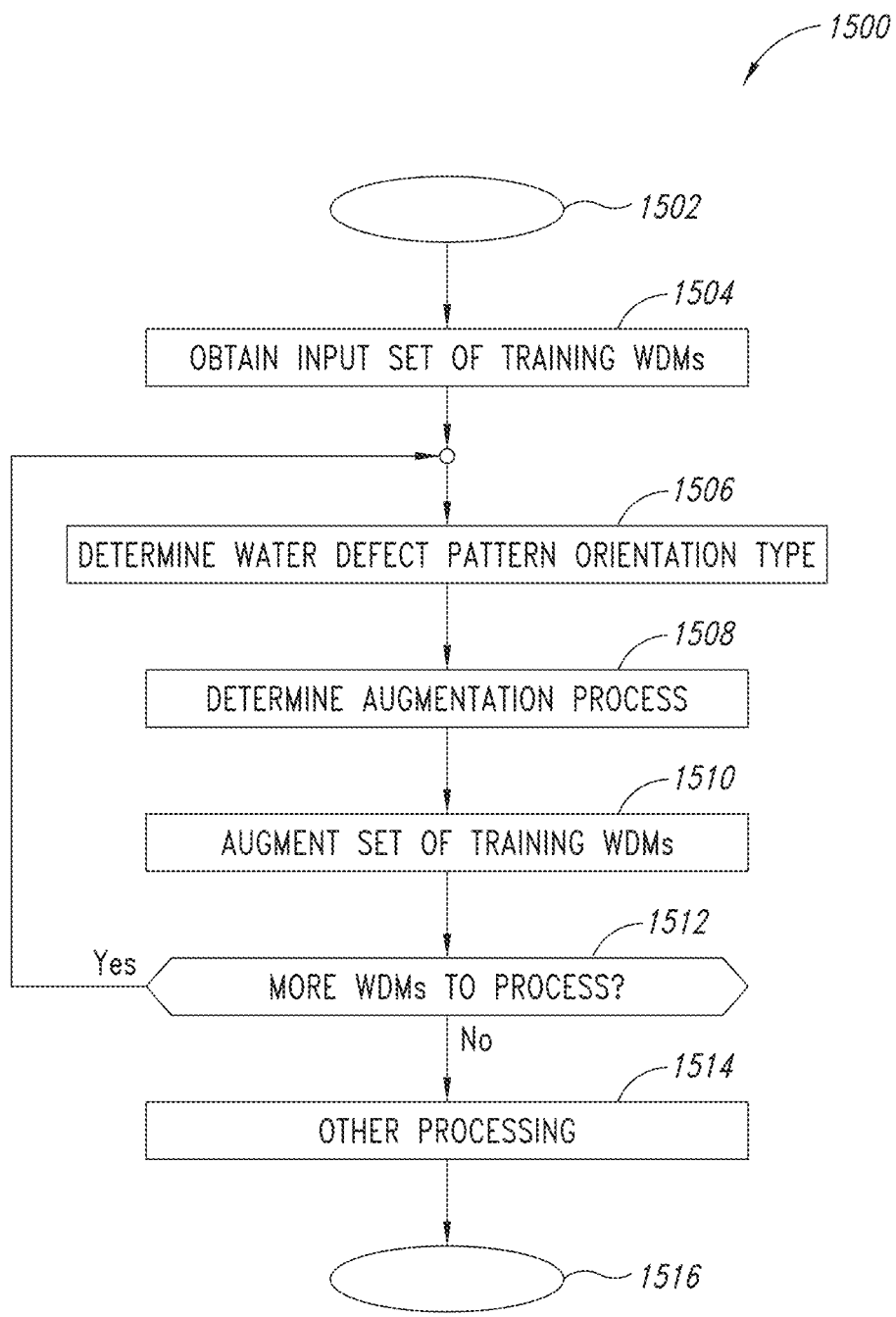
FIG. 15 illustrates an embodiment of augmenting a set of WDM training images.

FIG. 15 illustrates an example embodiment of a method 1500 of augmenting a WDM data set to generate a set of training images, which may be employed, for example, by the system 400 of FIG. 4, the system 500 of FIG. 5, or the system 2100 of FIG. 21. The method 1500 starts at 1502. The method 1500 may be started, for example, as part of a wafer manufacturing quality control process. The method 1500 may be employed, for example, by the method 1400 of FIG. 14 (e.g., as a subroutine to perform act 1408). The method 1500 proceeds from 1502 to 1504.

At 1504, the method 1500 obtains an input set of training wafer defect maps for one or more defect classes. The input set of training WDMs may be obtained from, for example, a wafer manufacturing system, retrieved from a memory, etc. The training WDMs have tags indicative of a wafer defect pattern orientation type, and typically have other context information (e.g., class and root cause information) associated with the WDMs as well. The method 1500 proceeds from 1504 to 1506.

At 1506, the method 1500 determines a wafer defect pattern orientation type associated with a training WDM of the input set of training WDMs. This may be done, for example, by extracting a tag indicative of the wafer defect pattern orientation type associated with the training WDM from the training WDM (e.g, from a determined location in a training WDM image (see FIGS. 11 and 12), from a text file such as a Klarf file, etc.). The tags may be based on an index (e.g., 1-5), indicative of a wafer defect pattern orientation type of the training WDM. The method 1500 proceeds from 1506 to 1508.

At 1508, the method 1500 determines the augmentation processes to be performed using the training WDM based on the wafer defect pattern orientation type associated with the training WDM determined at 1506. This may be done, for example, using a look-up table. The augmentation processes may include flip and rotation augmentation transforms, random noise transforms, etc., and various combinations thereof. FIGS. 6-10 illustrate examples of flip and rotation transforms that may be selected based on the determined wafer defect pattern orientation types. Other factors may be considered in determining the augmentation processes to be performed using the training WDM, such as a total number of augmented WDMs to be produced for a WDM, a class associated with the WDM, etc. and various combinations thereof. For example, for certain classes it may be desirable to produce a number N of augmented WDMs for each training WDM in the class, while in other classes, it may be desirable to produce a different number M of augmented WDMs for each training WDM in the class. For example, to provide balance between classes in the augmented training data set (e.g., the augmentation processes to be applied are determined so as to produce an augmented training data set having a same number of training images in each class of a defined set of classes). The method 1500 proceeds from 1508 to 1510.

At 1510, the input training set of WDMs is augmented using the augmentation processes determined at 1508. This may be done by including the original training WDM and additional WDMs generated using the determined augmentation processes in an augmented training set of WDMs. The method proceeds from 1510 to 1512.

At 1512, the method 1500 determines whether there are additional WDMs in the input training set of WDMs to be processed. When it is determined at 1512 that there are additional WDMs in the input set of training WDMs to be processed, the method 1500 returns to 1506 to process another training WDM in the set of training WDMs. When it is not determined at 1512 that there are additional WDMs in the input set of training WDMs to be processed, the method 1500 from 1512 to 1514.

At 1514, the method 1500 optional performs other processing on the augmented set of training data. For example, in an embodiment, the tags indicative of the wafer defect pattern orientation types may be removed prior to the training to avoid introducing a bias based on the wafer defect pattern orientation tags (e.g., based on a pixel patterns embedded in the WDMs, see FIGS. 11 and 12). The method 1500 proceeds from 1514 to 1516, where the augmented training set of WDMs may be provided to train a classifier.

Embodiments of methods of augmenting a training set of WDMs may contain additional acts not shown in FIG. 15, may not contain all of the acts shown in FIG. 15, may perform acts shown in FIG. 15 in various orders, and may be modified in various respects. For example, the method 1500 may combine acts 1506 and 1508 in some embodiments, for example, by extracting an index indicative of a wafer defect pattern orientation of a WDM and using the extracted index to determine the augmentation processes to be performed using a look-up table, etc. In another example, the input set of training WDMs may be processed in parallel.

Figure 16:
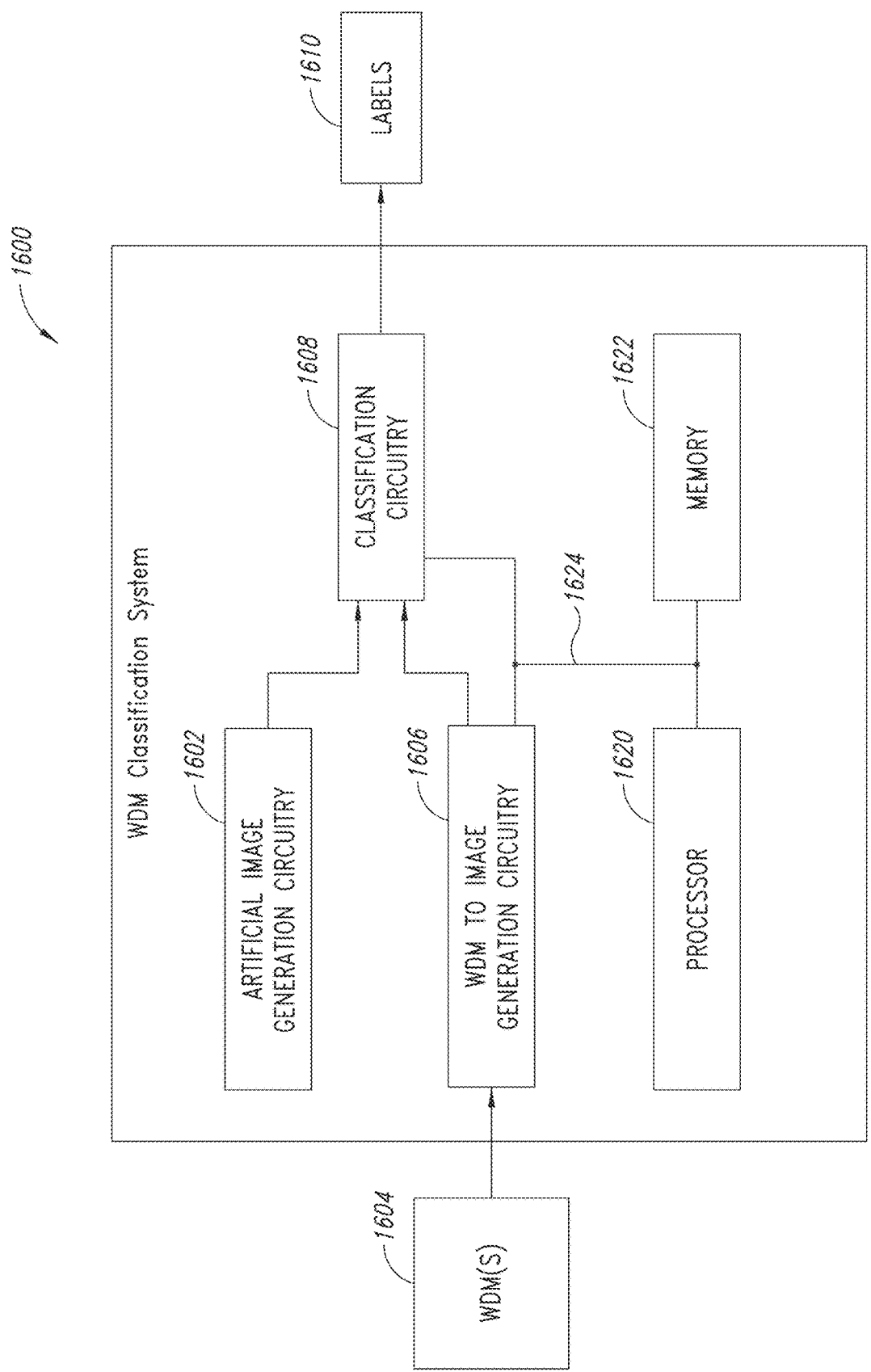
FIG. 16 is a functional block diagram of an embodiment of a WDM classification system trained using artificial wafer defect images (AWDIs).

In an embodiment, artificial or imitation wafer defect digital images are used instead of WDMs in a training phase. FIG. 16 illustrates an embodiment of a wafer defect map classification system 1600 which automatically classifies wafer defect maps based on a model trained using AWDIs instead of WDMs or augmented WDMs. In a training phase of an embodiment, artificial or imitation wafer defect digital images (AWDIs) are generated by artificial image generation circuitry 1602, or retrieved (e.g., from the memory 1622 or from an external memory via an interface (not shown)), as discussed in more detail elsewhere herein. The artificially created AWDIs have labels and may have tags (e.g., generated in view of the analysis of the particular production process and the noted characteristic patterns of real WDM images). The AWDIs may have artificial defect orientation types, such as the types discussed above with respect to WDMs in FIGS. 6 to 10. The tags may include artificial defect pattern orientation tags, in a manner similar to the wafer defect pattern orientation tags, as discussed above.

The AWDIs may be generated, for example, using python language, a graphical user interface, etc. Real WDMs may be studied to identify patterns associated with the WDMs. Artificial images may be generated with random shapes using Bezier curves. An iterative process may be employed to refine the artificial training data set, as discussed in more detail herein.

WDM to digital image generation circuitry 1606 generates a set of digital images from a set of WDMs 1604 during a classification or testing phase. Digital images are analyzed by classification circuitry 1608, which may comprise, for example, a deep CNN. During the training phase, a data driven model associating WDMs with WDM defect classes (and root causes) is learned by the classification circuitry 1608 based on the AWDIs generated by the artificial image generation circuitry 1602. During a test or a use phase, a set of labels and tags 1610 which have a best match to the set of actual WDMs 1604 according to the data-driven model is output by the classification circuitry 1608. In some embodiments, the set of tags may be output, while the set of labels is used internally by the CNN (e.g., to determine a tag associated with a training WDM best matching an input WDM). Testing of embodiments shows that using a data driven model associating AWDIs with WDM defect classes (and root causes) may provide better results than using a data driven model associating WDMs with WDM defect classes (and root causes).

As illustrated, the system 1600 comprises one or more processors 1620, one or more memories 1622, which may be used to implement the functionality of the artificial image generation circuitry 1602, the WDM to image generation circuitry 1606 and the classification circuitry 1608. The system 1600 as illustrated also comprises one or more bus systems 1624 (a portion of which is omitted for ease of illustration), and may include additional circuitry, such as power supplies, interfaces, etc., which are omitted for ease of illustration.

The system 1600 may include more components than illustrated, may include fewer components that illustrated, may combine or split components in various manners, and may have configurations other than the illustrated configuration. For example, in some embodiments, AWDIs output by the artificial image generation circuitry 1602 may be provided to the WDM to image generation circuitry 1604 for processing before being provided to the classification circuitry 1608. In another example, in some embodiments the artificial image generation circuitry 1602 may be omitted, for example when the AWDI training data set is stored in the memory 1622, or when the system 1600 is to operate only in a classification mode.

Figure 17:
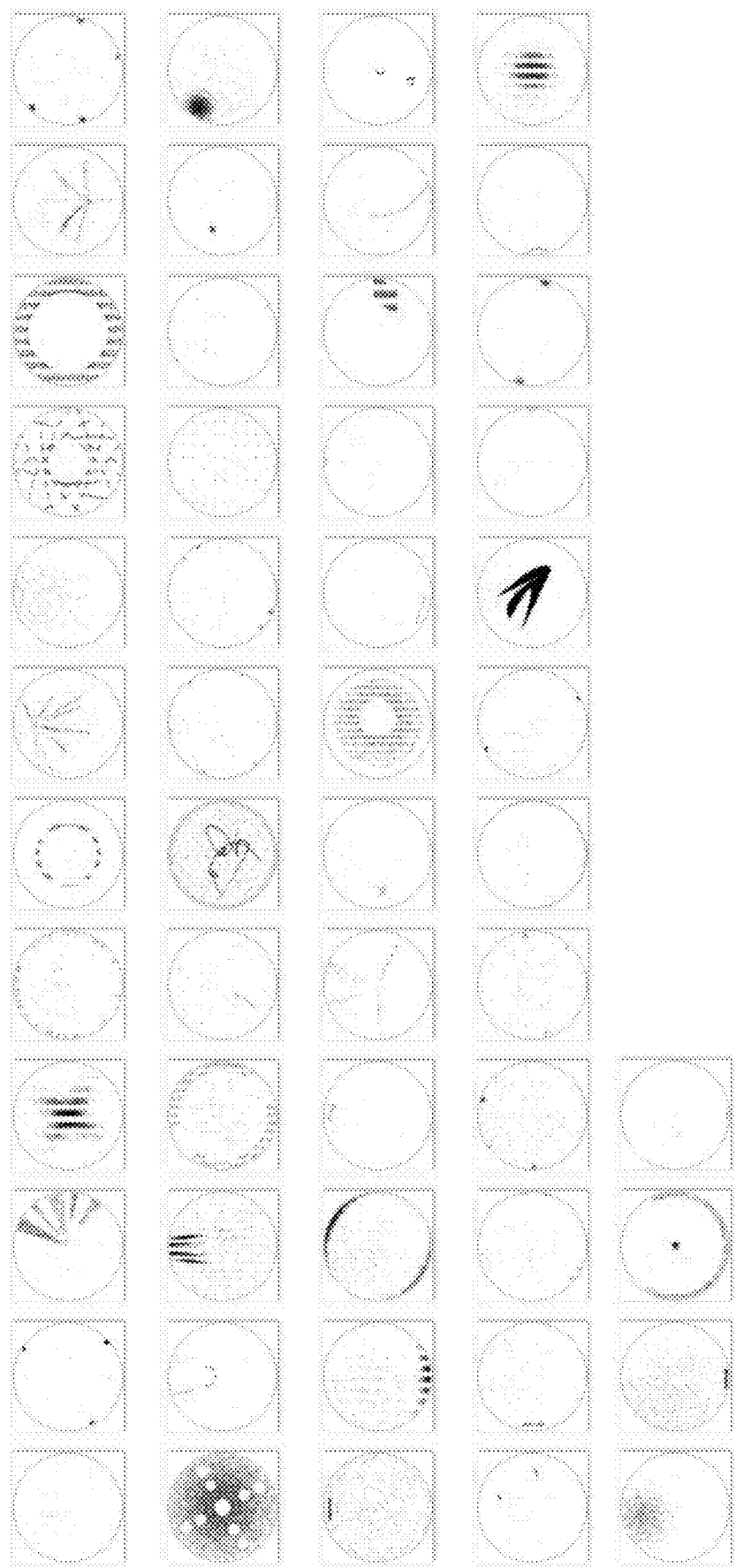
FIG. 17 illustrates an example set of classes of artificially generated artificial wafer defect images (AWDIs).

FIG. 17 illustrates example classes of AWDIs that may be employed to train a WDM classification system, such as the classification system 1600 of FIG. 16. As illustrated, fifty-two classes of artificial images have been coded. For classifying wafer defect maps, it may be desirable to have 100 artificial image classes or more. For each coded class, a plurality of AWDI images, for example, 2000 images, may be generated. In practice, obtaining already labeled wafer-maps of actual images can be difficult. Generating artificial AWDIs facilitates generating a large training data set even for classes having only a few real images available. The same number of artificial images may be generated for each class, which facilitates training with a balanced data set. A large (and balanced) data set facilitates avoiding overfitting and training with images representing all the potential cases of a specific class.

Figure 18:
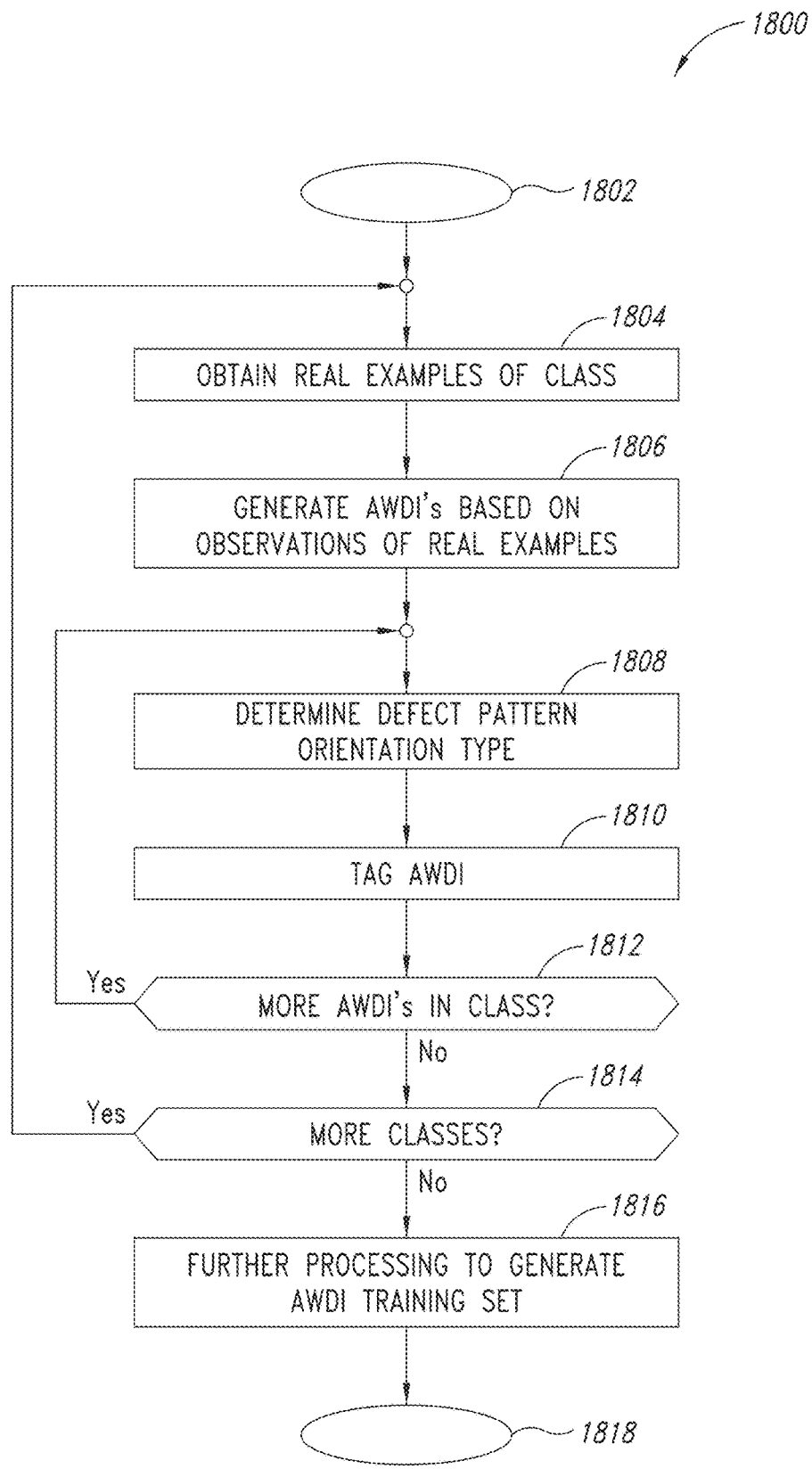
FIG. 18 illustrates an embodiment of a method of tagging a set of AWDIs to indicate wafer defect pattern orientations of the AWDIs.

FIG. 18 illustrates an example embodiment of a method 1800 of generating and tagging a set of AWDIs corresponding to wafer defect classes to indicate artificial defect pattern orientation types of the AWDIs of the set. The method 1800 may be employed by, for example, the system 1600 of FIG. 16, the system 2100 of FIG. 21, etc.

The method 1800 starts at 1802. The method 1800 may be started, for example, as part of a wafer manufacturing quality control process. The method 1800 proceeds from 1802 to 1804.

At 1804, the method 1800 obtains real examples of wafer defect maps for a defect class. The real examples may be obtained from, for example, a wafer manufacturing system. The method 1800 proceeds from 1804 to 1806.

At 1806, AWDIs are created for each class based on observations of the real examples. The AWDIs may be generated based on the observations of patterns of the defect class. Python language, a graphical user interface, etc., may be employed to generate the AWDIs which artificially mimic the patterns of the actual WDMs. The use of actual data or oversampling of actual data is avoided. The process may be iterative, and with a little practice, AWDI data sets may be generated which provide very accurate results. Artificial images may be generated with random shapes using Bezier curves. Artificial defect orientation types associated with the artificial defects may be considered during the process of generating the AWDIs (e.g., artificial images associated with more limiting artificial defect orientation types (e.g., specific orientation types) may be avoided or supplemented with artificial images associated with more flexible defect orientation types (e.g., repeater orientation types). The method proceeds from 1806 to 1808.

At 1808, an AWDI in the set of AWDIs for the class is analyzed and evaluated to determine an orientation type of the artificial defect pattern of the AWDI. For example, the artificial defect pattern of an AWDI may be analyzed to determine an orientation type of the artificial defect pattern of the AWDI. The artificial defect patterns may have, for example, the orientation types discussed above with respect to FIGS. 6 to 10. The method 1800 proceeds from 1808 to 1810.

At 1810, the AWDI is tagged to indicate the AWDI has the determined artificial defect pattern orientation type. This may be done, for example, by including an artificial defect pattern orientation tag in a Klarf file, by embedding a pixel pattern indicative of the artificial defect pattern orientation type in the AWDI image, etc., and various combinations thereof. The pixel pattern may be embedded in a determined location of the AWDI image. The method 1800 proceeds from 1810 to 1812.

At 1812, the method 1800 determines whether there are more AWDIs in the set of AWDIs for the class to be processed. When it is determined at 1812 that there are more AWDIs in the set of AWDIs for the class to be processed (Yes at 1812), the method 1800 returns to 1808 to process another AWDI for the class in the set of AWDIs. When it is determined at 1812 that there are no more AWDIs of the set of AWDIs for the class to be processed (No at 1812), the method 1800 proceeds to 1814.

At 1814, the method 1800 determines whether there are more defect classes to be processed. When it is determined at 1814 that there are more defect classes to be processed (Yes at 1814), the method 1800 returns to 1804 to process another defect class. When it is determined at 1814 that there are no more defect classes to be processed (No at 1814), the method 1800 proceeds to 1816, where optional further processing associated with generating a set of AWDI training data may be performed, such as augmenting the tagged set of AWDIs based on the artificial defect pattern orientation types of the tagged set of AWDIs. The method 1800 proceeds from 1816 to 1818, where further system processing may occur.

Embodiments of methods of generating and tagging a set of AWDIs to indicate artificial defect pattern orientations of the AWDIs of the set of AWDIs may contain additional acts not shown in FIG. 18, may not contain all of the acts shown in FIG. 18, may perform acts shown in FIG. 18 in various orders, and may be modified in various respects. For example, the method 1800 may analyze the WDMs to determine other characteristics of the AWDIs at act 1808 (e.g., root cause tags) and to label and tag the AWDIs with indicators of these other characteristics at act 1810. In some embodiments, pixel patterns may be added to the AWDIs to tag the AWDIs with indicators of the other characteristics (e.g., in respective determined locations such as discussed above with respect to WDMs in the discussion of FIG. 11). In another example, the set of AWDIs may be tagged in parallel at 1308 rather than sequentially.

Figure 19:
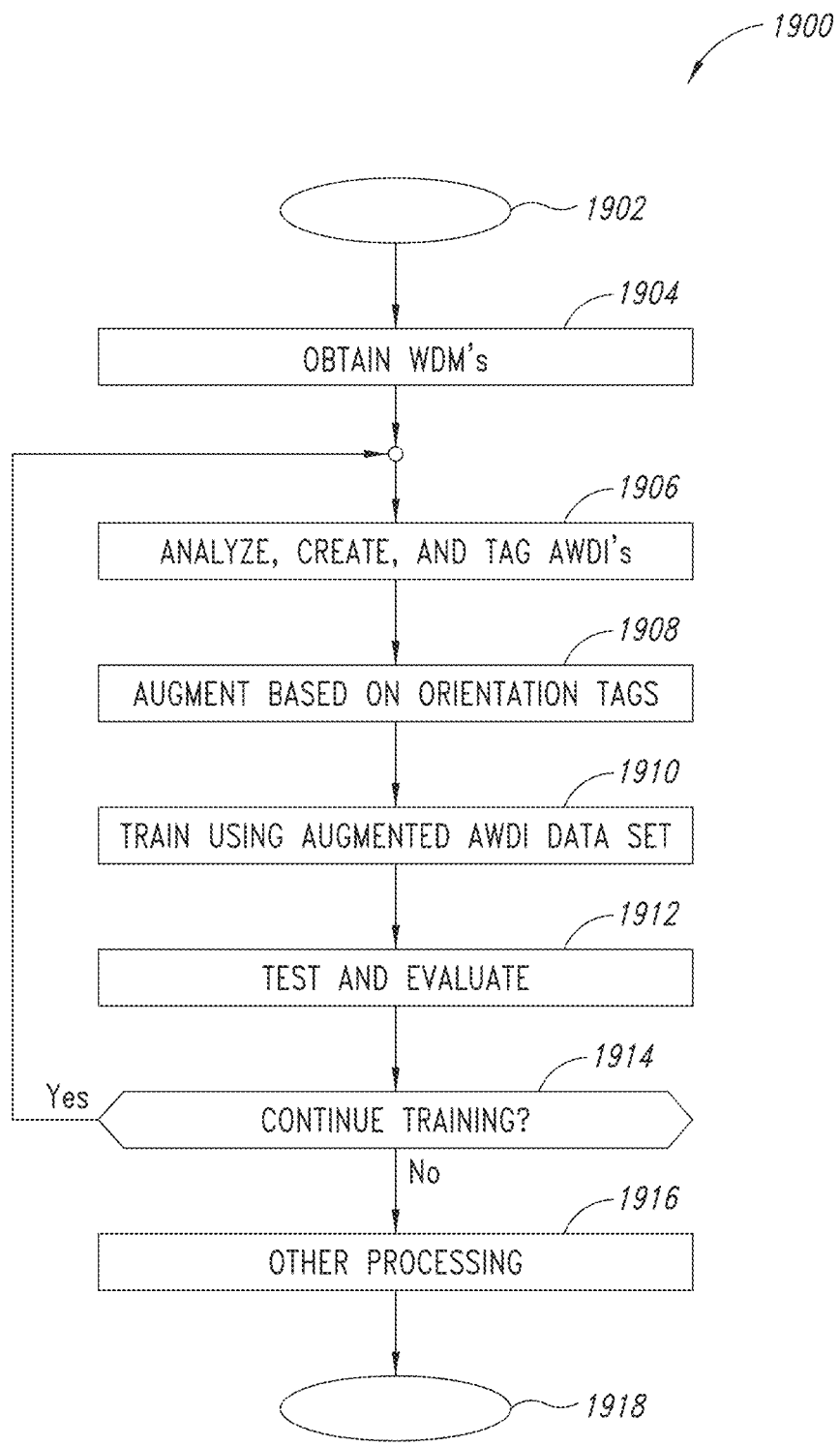
FIG. 19 illustrates an embodiment of a method of training a classifier using a set of AWDI training images.

FIG. 19 illustrates an example embodiment of a method 1900 of training a classifier using an augmented AWDI data set, which may be employed, for example, by the system 1600 of FIG. 16, by the system 2100 of FIG. 21, etc. The method 1900 starts at 1902. The method 1900 may be started, for example, as part of a wafer manufacturing quality control process. The method 1900 proceeds from 1902 to 1904.

At 1904, the method 1900 obtains wafer defect maps for a plurality of defect classes. The WDMs may be obtained from, for example, a wafer manufacturing system, retrieved from a memory, etc. The method 1900 proceeds from 1904 to 1906.

At 1906, the WDMs are analyzed, and AWDIs are created, labeled and tagged. For example, WDMs are analyzed, characteristic patterns of the defect classes are identified, root defect causes are determined, AWDIs are generated and artificial defect pattern orientation types are determined for the AWDIs, and the AWDIs are labeled and tagged in accordance therewith. An embodiment of the method 1800 of FIG. 18 may be employed to analyze, and create, label and tag the AWDIs. The artificial defect pattern orientation tags may be embedded in an artificial wafer defect image at a determined location. See, e.g., FIG. 11 and the description thereof (illustrating an example in the context of a WDM instead of an AWDI). In some embodiments, the absence of a tag in a determined location indicates the AWDI does not have an orientation type. The method 1900 proceeds from 1906 to 1908.

At 1908, the set of AWDIs is augmented by selectively applying transforms to AWDIs of the generated set of AWDIs based on tags indicative of the artificial defect pattern orientation types of the AWDIs. For example, an embodiment of the method 2000 of FIG. 20 may be employed to augment the generated set of AWDIs. The method proceeds from 1908 to 1910. As noted above, the process may be iterative, and with a little practice, large AWDI data sets may be generated which provide very accurate results. For example, a dataset having 52 classes with 2000 images in each class may be created.

At 1910, the method 1900 trains the classification system using the augmented AWDI data set. The method 1900 proceeds from 1910 to 1912. At 1912, the method 1900 processes test or actual data using the classifier trained with the augmented AWDI training data set and evaluates the results to determine how accurately the trained classifier classified the test or actual data. In an embodiment, the tags indicative of the artificial defect pattern orientation types may be removed prior to the training or otherwise not considered (e.g., ignored) during the training to avoid introducing a bias based on the artificial defect pattern orientation tags (e.g., based on a pixel patterns embedded in the AWDIs, see FIGS. 11 and 12 (in the context of WDMs). The method 1900 proceeds from 1912 to 1914.

At 1914, the method 1900 determines whether training of the classifier should continue, for example based on whether the results are sufficiently accurate, whether a sufficient number of training loops have been performed, etc. This may be done for each class, for a group of classes, or for all of the classes. Statistical analysis may be employed. When it is determined at 1914 that the training should continue (Yes at 1914), the method returns to 1906, where the evaluation of the WDMs, the creation and tagging of the AWDIs, the augmentation procedures, etc., may be modified to take into account the evaluation of the results at 1912. For example, the results may indicate that a new class should be added, or that additional augmentation should be performed, that a training loop with different augmented AWDIs should be performed, etc. When it is determined at 1914 that the training is complete (No at 1914), the method 1900 proceeds to 1916, where further processing associated with the training may be performed, such as storing weights and parameters associated with the classifier.

In an embodiment, the training is performed in several loops, and the augmentation performed on an AWDI of the set of AWDIs varies between the loops. For example, in a first training loop, a first type of augmentation may be performed on an AWDI, and that augmented AWDI used to train the model in the first loop. In a second training loop, a second type of augmentation is performed on the AWDI, and that augmented AWDI is used to train the model in the second loop, etc. In this manner, the training uses different AWDIs in each training loop, which may provide for a more accurate model. In an embodiment, the artificial defect orientation tag of an AWDI may be modified to indicate the type of augmentation process performed in a previous loop or to be performed in a next loop. Indexed may be employed to vary the augmentation processes employed between loops.

The method 1900 proceeds from 1916 to 1918, where further system processing may occur.

Embodiments of methods of training a classifier using an AWDI training data set may contain additional acts not shown in FIG. 19, may not contain all of the acts shown in FIG. 19, may perform acts shown in FIG. 19 in various orders, and may be modified in various respects. For example, the method 1900 may separate act 1906 in some embodiments, for example, by analyzing and creating the AWDIs prior to tagging the AWDIs to indicate the artificial defect pattern orientation type, etc.

Figure 20:
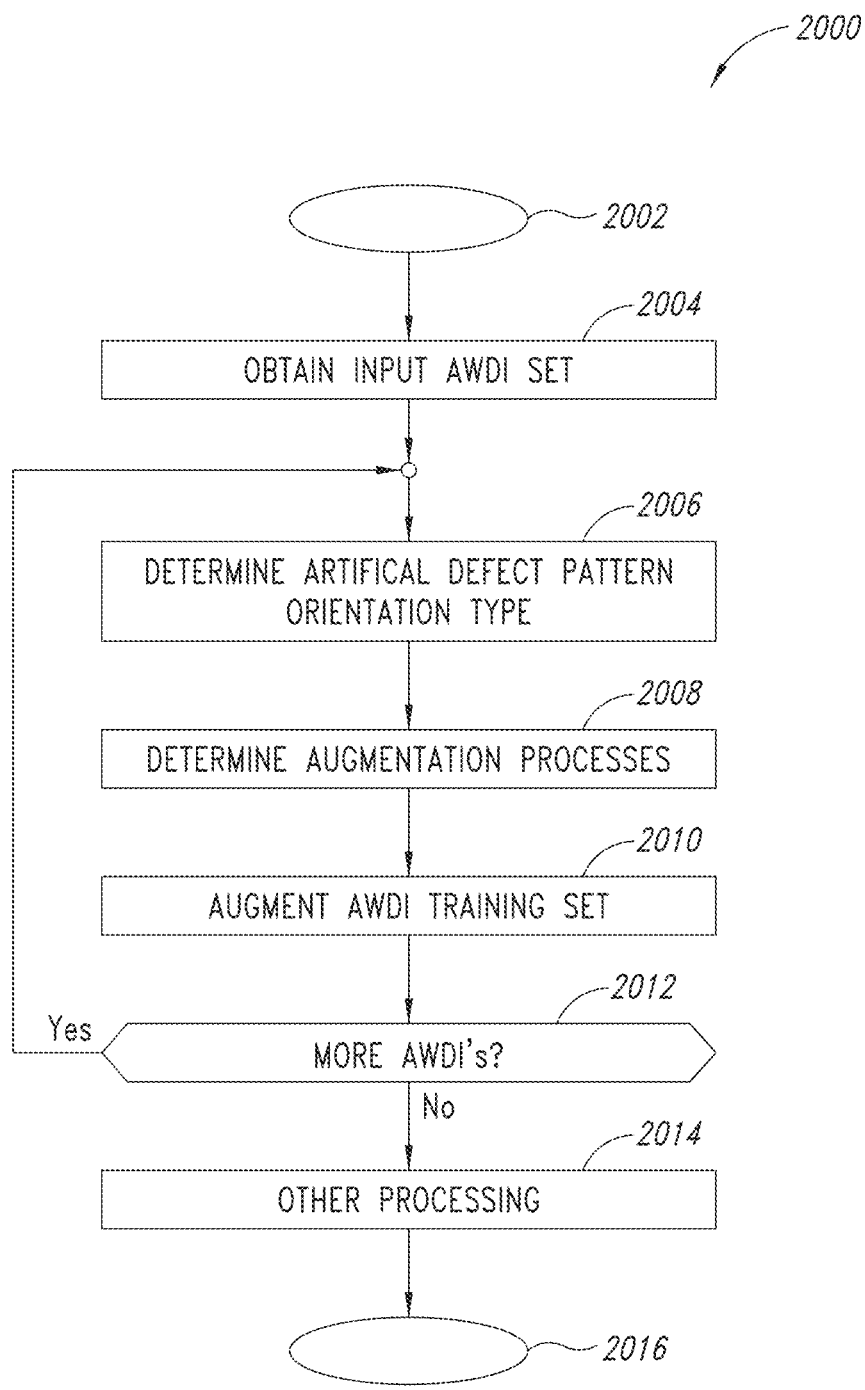
FIG. 20 illustrates an embodiment of augmenting a set of AWDI training images.

FIG. 20 illustrates an example embodiment of a method 2000 of augmenting an AWDI data set to generate a set of AWDI training images, which may be employed, for example, by the system 1600 of FIG. 16, the system 2100 of FIG. 21, etc. The method 2000 starts at 2002. The method 2000 may be started, for example, as part of a wafer manufacturing quality control process. The method 2000 may be employed, for example, by the method 1900 of FIG. 19 (e.g., as a subroutine to perform act 1908). The method 2000 proceeds from 2002 to 2004.

At 2004, the method 2000 obtains an input set of AWDIs for one or more defect classes. The input set of AWDIs may be obtained, for example, by using the method 1800 of FIG. 18, by retrieving an AWDI set from a memory, etc. The AWDIs have tags indicative of an artificial defect pattern orientation type, and typically have other context information (e.g., class and root cause information) associated with the AWDIs as well. The method 2000 proceeds from 2004 to 2006.

At 2006, the method 2000 determines an artificial defect pattern orientation type associated with an AWDI of the input set. This may be done, for example, by extracting a tag indicative of the artificial defect pattern orientation type associated with the AWDI from the AWDI (e.g., from a determined location in the AWDI image such as an upper left corner of the image (see FIGS. 11 and 12), from a text file such as a Klarf file, etc.). The absence of an orientation tag may indicate the AWDI has a non-oriented defect pattern. The tags may be based on an index (e.g., 1-5), indicative of a wafer defect pattern orientation type of the AWDI. The method 2000 proceeds from 2006 to 2008.

At 2008, the method 2000 determines the augmentation processes to be performed using the AWDI based on the artificial defect pattern orientation type associated with the AWDI determined at 2006. This may be done, for example, using a look-up table. The augmentation processes may include flip and rotation augmentation transforms, random noise transforms, etc., and various combinations thereof. FIGS. 6-10 illustrate examples of flip and rotation transforms that may be selected based on the determined artificial defect pattern orientation types. Other factors may be considered in determining the augmentation processes to be performed using the AWDI, such as a total number of augmented AWDIs to be produced for an AWDI, a class associated with the AWDI, etc., augmentation processes and parameters used in previous augmentation loops, and various combinations thereof. For example, for certain classes it may be desirable to produce a number N of augmented AWDIs for each class, while in other classes, it may be desirable to produce a different number M of augmented AWDIs for each class. For example, to provide balance between classes in the augmented AWDI training data set (e.g., the augmentation processes to be applied are determined so as to produce an augmented training data set having a same number of AWDI training images in each class of a defined set of classes). The method 2000 proceeds from 2008 to 2010.

At 2010, the input set of AWDIs is augmented using the augmentation processes determined at 2008. This may be done by including a source AWDI, augmented AWDIs generated using the determined augmentation processes, and various combinations thereof, in an augmented training set of AWDIs. The method proceeds from 2010 to 2012.

At 2012, the method 2000 determines whether there are additional AWDIs in the input set of AWDIs to be processed. When it is determined at 2012 that there are additional AWDIs in the set of AWDIs to be processed, the method 2000 returns to 2006 to process another AWDIs in the set of AWDIs. When it is not determined at 2012 that there are additional AWDIs in the input set of AWDIs to be processed, the method 2000 from 2012 to 2014.

At 2014, the method 2000 optional performs other processing on the augmented set of AWDIs. For example, in an embodiment, the tags indicative of the artificial defect pattern orientation types may be removed prior to the training to avoid introducing a bias based on the artificial defect pattern orientation tags (e.g., based on a pixel patterns embedded in the AWDIs, see FIGS. 11 and 12 (in the context of WDMs). The method 2000 proceeds from 2014 to 2016, where the augmented set of AWDIs may be provided to train a classifier.

Embodiments of methods of augmenting a set of AWDIs may contain additional acts not shown in FIG. 20, may not contain all of the acts shown in FIG. 20, may perform acts shown in FIG. 20 in various orders, and may be modified in various respects. For example, the method 2000 may combine acts 2006 and 2008 in some embodiments, for example, by extracting an index indicative of an artificial defect pattern orientation of an AWDI and using the extracted index to determine the augmentation processes to be performed using a look-up table, etc. In another example, the input set of AWDIs may be processed in parallel.

FIG. 21 is a functional block diagram of an embodiment of a WDM image classification system 2100, which may be employed, for example, as the classification circuitry 406 in an embodiment of the WDM classification system 400 of FIG. 4, as the classification circuitry 1608 in the embodiment of a classification system 1600 of FIG. 16, etc. The image classification system 2000 may be configured to operate in a plurality of phases, including a training phase, a testing phase and a classification phase. Some embodiments may store models trained using an augmented training set of WDMs, or trained using an augmented set of AWDIs. Some embodiments may employ only the classification phase.

The image classification system 2100 as illustrated comprises a deep neural network 2102 having a plurality of layers, including convolutional layers 2104 (Conv3, Conv4), max pooling convolutional layers 2106 (Conv1, Conv2, Conv5), and fully connected layers 2108 (Fc1, Fc2, Fc3). Other layers (not shown) may be employed, such as dropout layers and an activation function. In a training phase, the system 2100 receives an augmented set of training WDMs or an augmented set of AWDIs including associated labels and optionally tags. In a testing and classification phase, the system receives WDMs, which may include some associated tag information, such as the machines used to process the wafer. Typically, in the testing and classification phase, the labels identifying a defect class and the tag information identifying a root defect cause and a wafer defect pattern orientation type would be missing. In the training phase, the WDM classification system 2100 generates, based on the labeled training data in the augmented set of training WDMs or in the augmented set of AWDIs, a data driven model mapping input WDMs to labels identifying classes and, in some embodiments, to tags associated with root defect causes. In the testing and classification phases, the WDM classification system 2100 outputs a set of labels and tags associated with the input WDMs. The system 400 of FIG. 4, or the system 1600 of FIG. 16, for example, may be used to implement the WDM classification system 2100, including the functionality of the layers of the WDM classification system 2100.

A convolutional layer comprises a small matrix sliding over an input image, and, in operation, may have a kernel size of, for example, 3×3, and respective dimensionalities of an output space of 32, 64 and 128 (e.g., the number of output filters in the convolutions are respectively 32, 64 and 128). Training may be accelerated by introducing non-linearity. The max pooling convolutional layers 2106, in operation, may downsample, reducing the parameters and addressing overfitting.

The fully connected layers 2108, in operation, connect every neuron in one layer to every neuron in another layer, and determine which features most correlate to one or more particular classes. The fully connected layers 2108 receive an input volume (the output of the preceding layer) and output an m-dimensional vector, where m is the number of classes that the model has available to choose from. In the example of FIG. 3, m is twelve. In the example of FIG. 17, m is fifty-two.

Embodiments of the system 2100 may comprise more or fewer layers and circuits than illustrated, and layers and circuits may be combined and separated into additional layers and circuits in various manners. For example, other types of pooling layers may be employed, such as average pooling layers.

In some embodiments, the system 2100 may be a multi-input CNN where metadata may be provided during the training phase, the inference phase, the testing phase, the classification phase, and various combinations thereof, to improve the accuracy of the model and of the predictions. For example, layer of inspection information, type of inspection information, etc., and various combinations thereof, may be provided to a fully connected layer, such as layer Fc2, as shown by the dashed input line to Fc2 in FIG. 21).

Layer of inspection information (e.g., information indicative of the conditions of the inspection of a wafer associated with a WDM or with an AWDI, such as information indicative of a machine or of a process stage of a wafer manufacturing process) indicates an association between an inspection layer and one or more defect classes of the set of defined defect classes. In other words, the inspection information indicates to a layer of a CNN (for example, Fc2 of FIG. 21) that potentially a specific defect class may be determined at the layer. For example, when a Klarf file or other representation of a WDM (or AWDI) is being generated, layer of inspection information may be generated and included in the klarf file based, for example, on a point in the manufacturing process at which the WDM is generated (or which the AWDI is intended to imitate). For example, if a particular machine is known to produce certain type of manufacturing defects, images generated after processing by that machine may be tagged (e.g., in the Klarf file) to indicate defect patterns corresponding to those defects may be detected at certain layers of a CNN, such as Fc2 in the CNN or deep neural network 2102 of FIG. 21. The information in the tag is employed by the CNN 2102 at Fc2, to indicate to the CNN that the defect pattern may be found at the Fc2 layer.

Figure 22:
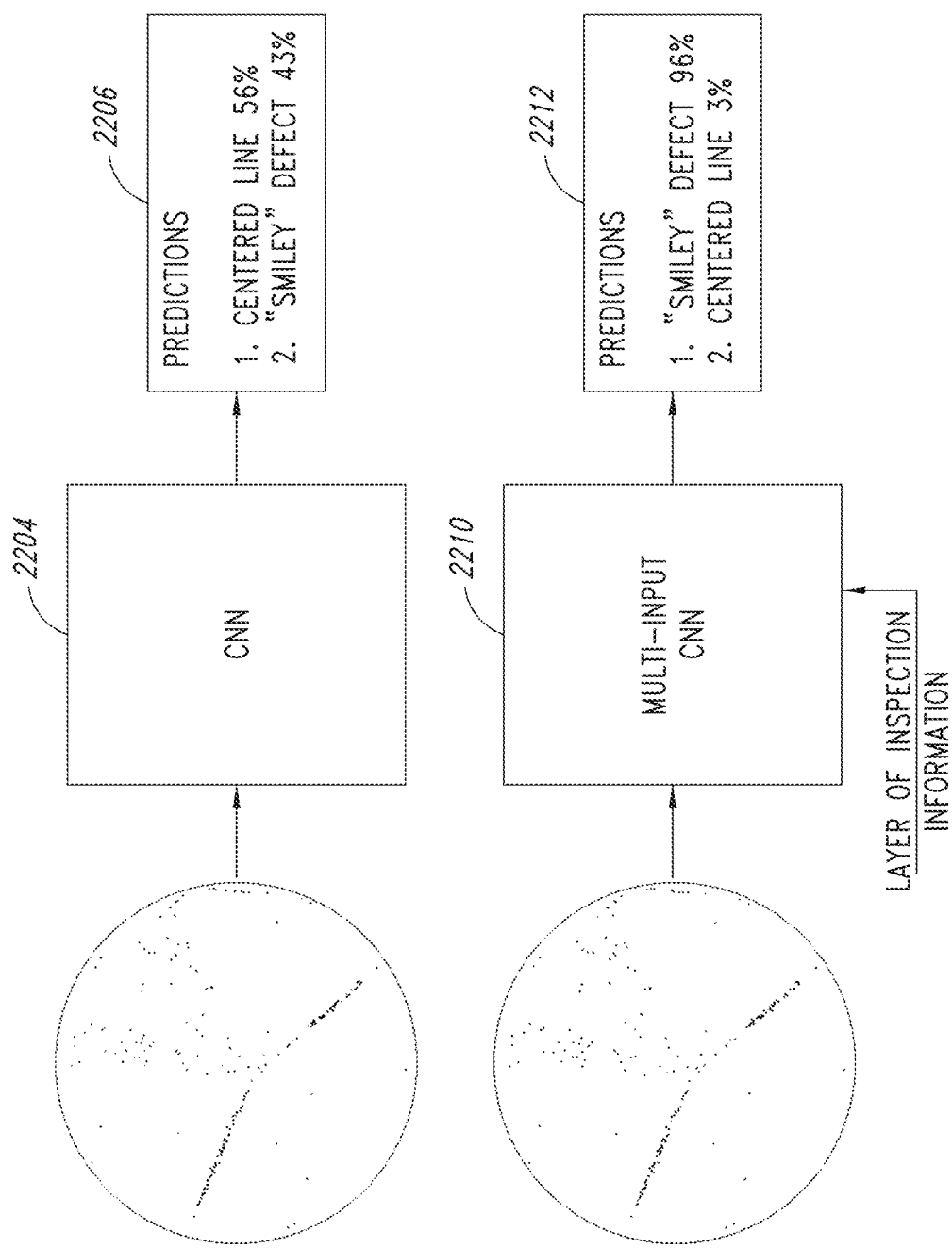
FIG. 22 illustrates results of predictions in which layer of inspection information is not provided to a fully connected layer, and in which layer of inspection information is provided to a fully connected layer.

FIG. 22 illustrates an example of an improvement in prediction accuracy that may occur when layer of inspection information is provided to a fully connected layer in an embodiment. In FIG. 22, when an image 2202 corresponding to a "smiley" defect (e.g., a digital image representation of a WDM in classification mode, testing mode, or training mode in some embodiments, an AWDI in a training mode in some embodiments) is provided to a CNN 2204 (e.g., the image classification system 2100 of FIG. 21) without providing layer of inference information, the accuracy of the prediction 2206 is low, as illustrated, 43%. In contrast, when layer of inspection information is provided to a multi-input CNN 2210, the accurate of the prediction 2212 is much higher, 96%.

Figure 23:
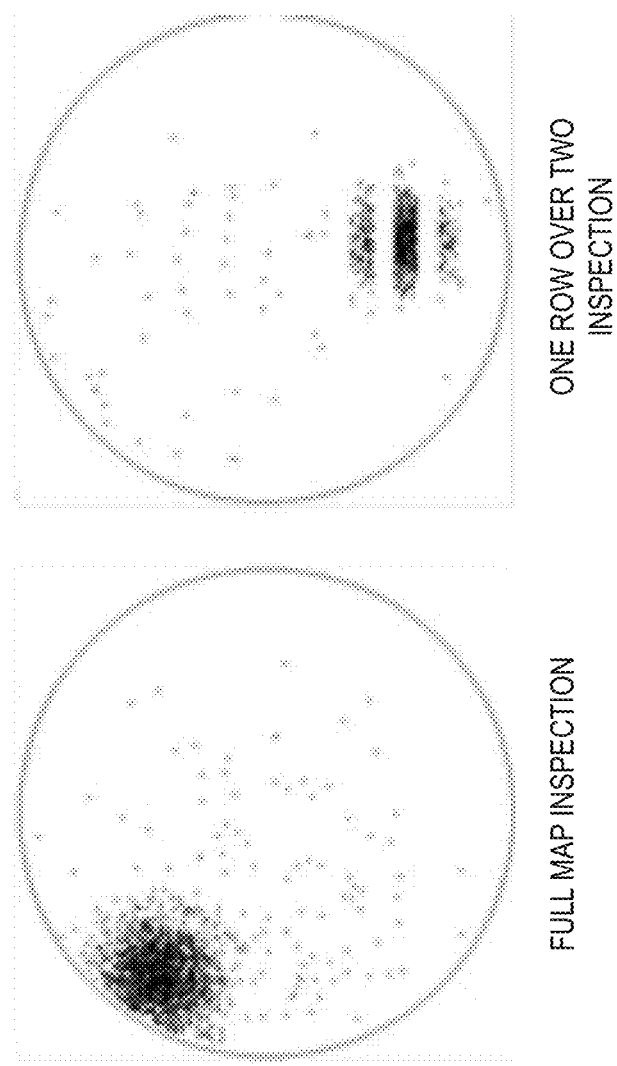
FIG. 23 illustrates example types of inspection that may be employed in an embodiment.

Type of inspection information indicates to a layer of a CNN, such as layer Fc2 of FIG. 21, that a particular type of inspection is to be performed, e.g., a full map inspection, one row over two rows, etc. FIG. 23 illustrates a full map inspection and a one row over two rows inspection. Indicating a one row over two inspection indicates to the CNN that the inspection provides only a partial view of a defect pattern. The type of inspection information may be determined, for example, when an image is generated, at run time based on user input, etc. One row over two scanning may be selected, for example, to save processing resources when the prediction results would be sufficiently accurate without a full map inspection.

Figure 24:
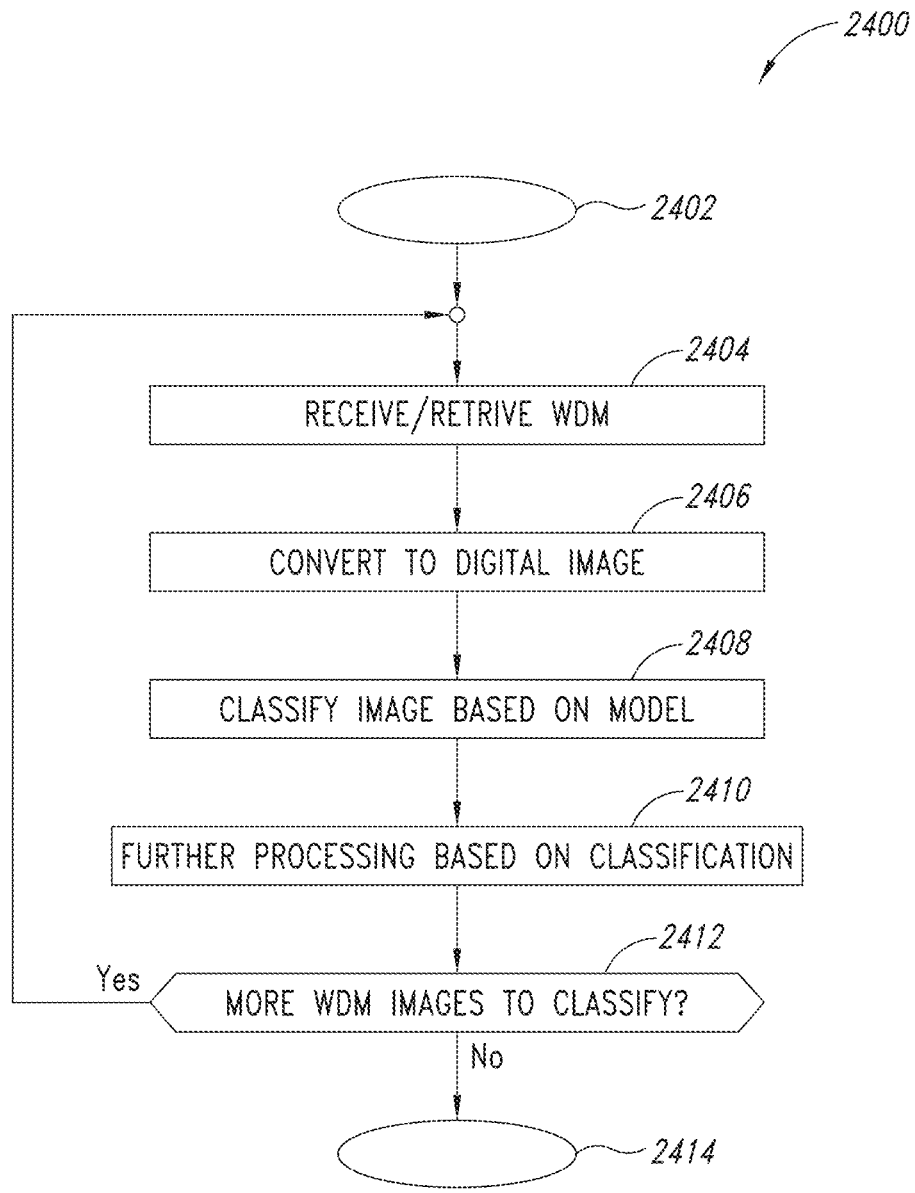
FIG. 24 illustrates an embodiment of a method of classifying WDM images using a classifier trained with an augmented WDM training data set.

FIG. 24 illustrates an embodiment of a method 2400, which may be employed, for example, by the embodiment of the system 400 of FIG. 4, the embodiment of the system 1600 of FIG. 16, the embodiment of the system 2100 of FIG. 21, etc., to classify WDMs. The method 2400 starts at 2402. The method 2400 may be started, for example, as part of a wafer manufacturing quality control process. The method 2400 proceeds from 2402 to 2404.

At 2404, the method 2400 receives or retrieves a WDM. The WDM may be generated by a wafer manufacturing quality control system or process or retrieved from a memory. The method 2400 proceeds from 2404 to 2406.

At 2406, the WDM is converted into a digital WDM image if necessary, for example by using the WDM to image generation circuitry 404 of FIG. 4 or the system 500 of FIG. 5. The method 2400 proceeds from 2406 to 2408.

At 2408, the method 2400 classifies the digital WDM image based on the digital WDM image and a data-driven model associating WDM images with classes of a defined set of classes of wafer defects. In an embodiment, the model may be generated using a WDM training data set augmented based on wafer defect pattern orientation types associated with WDM training images. In an embodiment, the model may be generated using an AWDI training data set augmented based on artificial wafer defect pattern orientation types associated with AWDI images. The classifying may be done, for example, by using a classification system, such as the classification system 400 of FIG. 4, the system 1600 of FIG. 16, the classification system 2100 of FIG. 21, trained using an augmented set of training images, for example, trained using the method 1400 of FIG. 14 or the method 1900 of FIG. 19. The method 2400 proceeds from 2408 to 2410.

At 2410, the method 2400 optionally performs further processing based on the classification of the image. For example, when the image is classified into particular classes, a warning signal may be generated. In another example, a count of images in the class may be incremented, and further action taken when the count exceeds a threshold value. Statistical analysis may be performed in determining whether to perform further processing based on the classification of the image. The method proceeds from 2410 to 2412.

At 2412, the method 2400 determines whether there are more WDM images to classify. When it is determined at 2412 that there are more WDM images to classify, the method 2400 returns to 2404 to receive or retrieve the next WDM. When it is not determined at 2410 that there are more WDM images to process, the method 2400 proceeds to 2414, where further processing, such as a return of the results of classifying a set of WDMs, may be performed.

Embodiments of methods of classifying WDMs may contain additional acts not shown in FIG. 24, may not contain all of the acts shown in FIG. 24, may perform acts shown in FIG. 24 in various orders, and may be modified in various respects. For example, the method 2400 may perform act 2410 after a set of WDMs is processed or periodically, instead of or in addition to performing act 2410 individually for each WDM. In another example, the method 2400 may process WDMs in parallel, etc. In another example, metadata indicative of layer of inspection information, type of inspection information, or both, may be provided to a classification system at act 2408, for example, the information may be extracted from a Klarf file and provided to a fully connected layer of a CNN of the classification system at act 2408.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   image generation circuitry, which, in operation, generates a digital image representation of a wafer defect map (WDM); and convolutional-neural-network (CNN) circuitry, which, in operation, generates a defect classification associated with the WDM based on:
the digital image representation of the WDM; and
a data-driven model associating WDM images with classes of a defined set of classes of wafer defects and generated using a data set of images, wherein the data set of images includes training images and augmented images generated based on defect pattern orientation types associated with the training images.

2. The device of claim 1 wherein the training images are digital image representations of WDMs.

3. The device of claim 1 wherein the training images are artificial wafer defect digital images (AWDIs).

4. The device of claim 1 wherein the training images are tagged with an indicator of a defect pattern orientation type.

5. The device of claim 4 wherein the detect pattern orientation type is one of a defined set of defect pattern orientation types.

6. The device of claim 5 wherein the defined set of defect pattern orientation types includes a repeater pattern orientation type; a horizontal and vertical pattern orientation type; a mirror pattern orientation type; a specific defect pattern orientation type; and a non-oriented defect pattern orientation type.

7. The device of claim 4 wherein the tags are embedded in pixels of the respective training images.

8. The device of claim 7 wherein the training images have a first pixel region containing defect patterns and a second pixel region and the tags are embedded in pixels of the second pixel region.

9. The device of claim 4 wherein the tags are embedded in comma separated text associated with the respective training images.

10. The device of claim 1 wherein the CNN circuitry, in operation,
associates, based on the digital image representation of the WDM and the data-driven model, one or more labels and one or more root cause tags with the WDM which are associated with a defect cause.

11. The device of claim 1 wherein the CNN circuitry includes one or more convolutional layers.

12. The device of claim 1 wherein, in a training mode of operation, the CNN circuitry:
augments the training images by selectively applying transforms to a training image based on the defect pattern orientation types associated with the training image; and
generates the data-driven model using the augmented training data set.

13. The device of claim 1 wherein the augmented training data set includes, for each defined class of the set of classes of wafer defects, a same number N of training images.

14. The device of claim 1, wherein augmentation processes used to generate the augmented images are determined based on defect pattern orientation types associated with the training images.

15. A system, comprising:
one or more memories; and
wafer-defect-map (WDM) classification circuitry coupled to the one or more memories, which, in operation, generates a defect classification associated with the WDM based on:
a digital image representation of the WDM; and
a data-driven model associating WDM images with classes of a defined set of classes of wafer defects and generated using a training data set of images, wherein the training data set of images includes training images and augmented training images generated based on defect pattern orientation types associated with the training images.

16. The system of claim 15 wherein the training images are digital image representations of WDMs.

17. The system of claim 16 wherein the WDM classification circuitry, in operation, generates one or more control signals to control a wafer-production system based on defect classifications associated with one or more WDMs.

18. The system of claim 15 wherein the training images are artificial wafer defect digital images (AWDIs).

19. The system of claim 15 wherein the training images upon which augmentation of the training data set is based are tagged with an indicator of a defect pattern orientation type of a defined set of defect pattern orientation types, the defined set of defect pattern orientation types including a repeater pattern orientation type; a horizontal and vertical pattern orientation type; a mirror pattern orientation type; a specific defect pattern orientation type; and a non-oriented defect pattern orientation type.

20. The system of claim 15 wherein the WDM classification circuitry, in operation,
associates, based on the digital image representation of the WDM and the data-driven model, one or more labels and one or more root cause tags with the WDM which are associated with a defect cause.

21. The system of claim 15 wherein, in a training mode of operation, the WDM classification circuitry:
augments the training images by selectively applying one or more transforms to a training image based on the defect pattern orientation types associated with the training image; and
generates the data-driven model using the augmented training data set.

22. The system of claim 21 wherein the augmented training data set includes, for each defined class of the set of classes of wafer defects, a same number N of training images.

23. A method, comprising:
generating a digital image representation of a wafer defect map (WDM); and
generating a defect classification associated with the WDM based on:
the digital image representation of the WDM; and
a data-driven model associating WDM images with classes of a defined set of classes of wafer defects and generated using a training data set augmented based on defect pattern orientation types associated with training images.

24. The method of claim 23, comprising generating the data-driven model using the augmented training data set.

25. The method of claim 24, comprising:
generating the augmented training data set.

26. The method of claim 25, comprising tagging training images with indicators of defect pattern orientation types.

27. The method of claim 26, comprising removing the tags indicating the defect pattern orientation types after generating the augmented training data set and before generating the model.

28. The method of claim 25 wherein the generating the augmented training data set comprises applying a transform to a training image based on a defect pattern orientation type associated with the training image.

29. The method of claim 25, wherein the generating the augmented training data set comprises determining an augmentation process to apply based on defect pattern orientation types associated with the training images.

30. The method of claim 23, comprising:
generating one or more control signals to control a wafer-production process based on defect classifications associated with one or more WDMs.

31. A non-transitory computer-readable medium having contents which configure a wafer defect map (WDM) classification system to perform a method, the method comprising:
generating a digital image representation of a wafer defect map (WDM); and
generating a defect classification associated with the WDM based on:
the digital image representation of the WDM; and
a data-driven model associating WDM images with classes of a defined set of classes of wafer defects and generated using a training data set augmented based on defect pattern orientation types associated with training images.

32. The non-transitory computer-readable medium of claim 31 wherein the method comprises generating the data-driven model using the augmented training data set.

33. The non-transitory computer-readable medium of claim 31 wherein the method comprises:
generating the augmented training data set.

* * * * *